United States Patent
Asano et al.

(10) Patent No.: US 8,591,841 B2
(45) Date of Patent: Nov. 26, 2013

(54) MICROREACTOR SYSTEM

(75) Inventors: Yukako Asano, Kashiwa (JP); Tetsuro Miyamoto, Kasumigaura (JP); Shigenori Togashi, Abiko (JP); Yoshishige Endo, Tsuchiura (JP); Hidekazu Tsudome, Ryugasaki (JP); Hajime Kato, Tsuchiura (JP)

(73) Assignee: Hitachi Plant Technologies, Ltd., Tokyo (JP)

(*) Notice: Subject to any disclaimer, the term of this patent is extended or adjusted under 35 U.S.C. 154(b) by 105 days.

(21) Appl. No.: 13/318,691

(22) PCT Filed: May 14, 2009

(86) PCT No.: PCT/JP2009/002122
§ 371 (c)(1),
(2), (4) Date: Nov. 3, 2011

(87) PCT Pub. No.: WO2010/131297
PCT Pub. Date: Nov. 18, 2010

(65) Prior Publication Data
US 2012/0045370 A1 Feb. 23, 2012

(51) Int. Cl.
*B01J 8/00* (2006.01)
*B01J 19/00* (2006.01)
*G05B 1/00* (2006.01)
*B01F 5/06* (2006.01)

(52) U.S. Cl.
USPC ........... 422/603; 422/105; 422/129; 422/130; 422/600; 366/336

(58) Field of Classification Search
USPC .................. 422/129, 130, 600, 630; 366/336; 42/129, 130, 600, 603, 630
See application file for complete search history.

(56) References Cited

U.S. PATENT DOCUMENTS

| 5,904,424 A | 5/1999 | Schwesinger et al. |
| 2008/0226516 A1 | 9/2008 | Suzuki |

FOREIGN PATENT DOCUMENTS

| JP | 11-511689 | 10/1999 |
| JP | 2004-77411 | 3/2004 |
| JP | 3638151 | 1/2005 |
| JP | 2005-319419 | 11/2005 |
| JP | 3810778 | 6/2006 |
| JP | 3873929 | 11/2006 |
| JP | 2007-69137 | 3/2007 |
| JP | 2007-260569 | 10/2007 |

(Continued)

OTHER PUBLICATIONS

Machine translation of JP 2008-221095 A, which was included with the filed IDS and published Sep. 25, 2008.*

(Continued)

*Primary Examiner* — Walter D Griffin
*Assistant Examiner* — Natasha Young
(74) *Attorney, Agent, or Firm* — Antonelli, Terry, Stout & Kraus, LLP.

(57) ABSTRACT

In relation to a microreactor, and also a microreactor system applying the same therein, not producing any dead volume therein, and thereby achieving a high level of mixing properties even at a low solution flow rate and having a simple structure thereof, disclosed herein are a microreactor and microreactor system, comprising a channel for mixing up at least two (2) types of fluids, and thereby conducting mixing/reacting of fluids by conducting the mixing/reacting of the fluids at least one (1) time, i.e., being suitable for so-called a multi-step reaction.

8 Claims, 16 Drawing Sheets

(56) References Cited

FOREIGN PATENT DOCUMENTS

| | | |
|---|---|---|
| JP | 2008-215859 | 9/2008 |
| JP | 2008-221095 | 9/2008 |
| JP | 2008-289449 | 12/2008 |
| WO | WO 96/30113 | 10/1996 |
| WO | WO 2006/001195 A1 | 1/2006 |

OTHER PUBLICATIONS

Machine translation of JP 2008-215859, which was included with the filed IDS and published on Sep. 18, 2008.*

Chinese Office Action of Appln. 200980159257.9 dated Jun. 20, 2013.

* cited by examiner

FIG. 8A
FIG. 8B
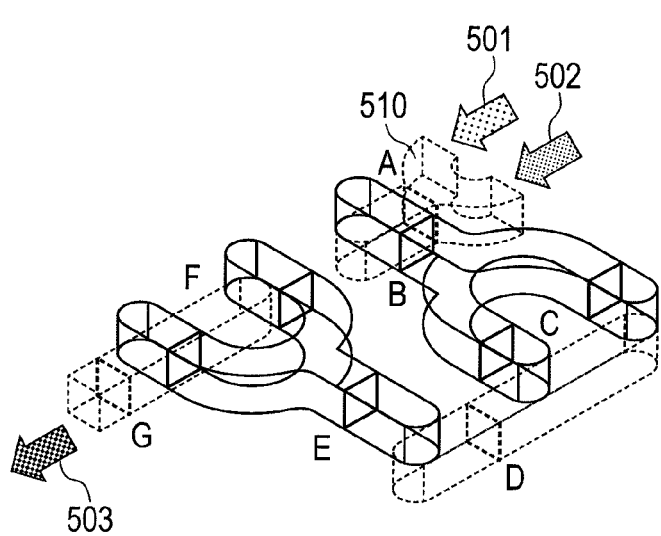
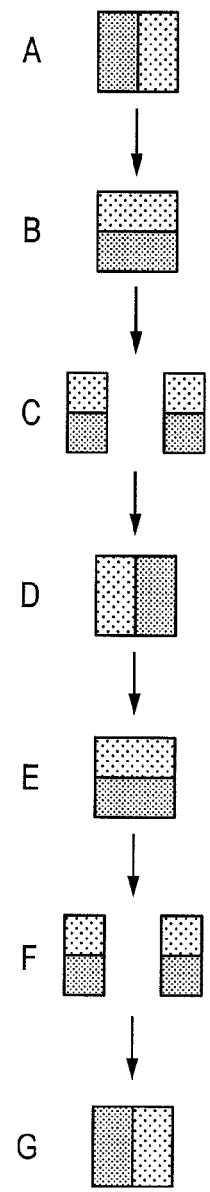

MICROREACTOR SYSTEM

TECHNICAL FIELD

The present invention relates to a microreactor and also a microreactor system applying the same therein, and in particular, it relates to a microreactor and a microreactor system, having a channel for mixing at least two (2) kinds of fluids and thereby conducting mixing/reacting of the fluids by splitting/mixing the fluids at least one (1) time, i.e., being suitable for so-called multi-step reaction.

BACKGROUND TECHNOLOGY

In recent years, approaches are made, enthusiastically or actively, on an application of an apparatus, manufactured by a microprocessing technology, for mixing fluids within a micro channel, i.e., so-called a microreactor, also in a bio/medical field or a field of chemical reaction.

Conventionally, many of the microreactors are designed, mainly targeting so-called "one-step reaction", for mixing only 2 kinds of reactants and thereby progressing the reaction. However, in recent years, it is expected to apply the microreactor into so-called "multi-step reaction", too, for mixing plural numbers of reactants, sequentially, and thereby brining the reactions to progress.

In particular, among the multi-step reactions, it is already known that the reaction cannot progress, well, through the conventional batch method, in particular, in case where a product produced on the way of the reaction is so-called "intermediate", since a fine temperature control and/or time control is/are required there. This is because, since the reaction intermediate is instable and short in the lifetime thereof, in general, so-called "hot spots" are generated, so that the reaction temperature rises up locally, and it may be dissolved if the time-period until the intermediate reaches to the reaction of a next step is longer than the lifetime.

As characteristics in a synthesis reaction by the microreactor are already known the followings, accompanying with reducing of size of the reaction field: (1) fast mixing can be made, (2) a surface area becomes large relatively to a volume of the liquid, an efficiency of heat exchange is increased, and a fine temperature control can be made, and also (3) a fine reaction time control can be made, by controlling flow rate(s) of the reactant(s), etc.

In particular, regarding the microreactor of the above-mentioned (1), for enabling high-speed mixture, various kinds of developments and studies are made thereupon. First of all, one is already known, which shortens the substantive diffusion distance of molecular by introducing 2 kinds of reactants in the form of multi-layers. In this case, in order to form stable layers, so-called a manifold (i.e., a dead volume) is provided on the reverse side of a unit for guiding the reactant,

PRIOR ART DOCUMENTS

Patent Documents

[Patent Document 1] Japanese Patent Laying-Open No. 2007-69137 (2007);
[Patent Document 2] Japanese Patent Laying-Open No. 2008-289449 (2008);
[Patent Document 3] Japanese Patent No. 3638151;
[Patent Document 4] Japanese Patent No. 3873929; and
[Patent Document 5] Japanese Patent No. 3810778.

BRIEF SUMMARY OF THE INVENTION

Problem(s) to be Dissolved by the Invention

However, when trying to apply the microreactor into the multi-step reaction, there may be brought about cases where the characteristics in the synthesis reaction with using the microreactor cannot be fully obtained, only if connecting the microreactors for use of the one (1)-step reaction in series.

FIG. 2 shows a block diagram of a microreactor system for the multi-step reaction (e.g., in case of the two (2)-step reaction), relating to the present invention. In the microreactor system of this FIG. 2, a solution 101 of the reactant 1 and a solution 102 of the reactant 2 are introduced into a first-step microreactor 201 for use of reaction, through an introducing portion 107 for the solution of the reactant 1 and also an introducing portion 108 for the solution of the reactant 2, with using a syringe 105 and a syringe pump 106, and thereby obtaining a solution of product of the first-step reaction, through the mixing/reacting between the solution of the reactant 1 and the solution of the reactant 2, via a reacting portion 110 for this first-step reaction. Further, the solution of product of the first-step reaction mentioned above and a solution 103 of a reactant 3 are introduced into a second-step microreactor 202 for use of reaction, through an introducing portion 111 for the solution of the reactant 3, with using the syringe 105 and the syringe pump 106, and thereby obtaining a solution of product of the second-step reaction, through the mixing/reacting among the solution of the reactant 1, the solution of the reactant 2 and the solution of the reactant 3, via a reacting portion 112 for this second-step reaction.

However, as was mentioned above, when applying the microreactor into the multi-step reaction, there are following problems:

First of all, it is a control of a fine reaction time-period for each of the one (1)-step reactions. However, in a microreactor after the second-step one, since the reaction proceeds even during the time when the reactants stay within the manifold, as a matter of fact, the time during when they stay within the manifold is added to the reaction time in the reaction(s) of the previous step(s). Accordingly, it is desired to provide a microreactor, not necessary the manifold, but enabling the fine control on the reaction time-period.

Second, it is maintenance of mixing performance within the microreactor, in particular, in an upstream side thereof. In case of applying the microreactors, being connected in series, into the multi-step reaction, a flow rate comes to be small, necessarily, within the microreactor, in the upstream side thereof. Since the mixing performance is lowered down when the flow rate comes to be small, it is desirous to provide a microreactor having a high mixing performance even in the case where the flow rate is small. In particular, when sending a liquid having high viscosity, it is necessary to reduce the flow rate due to a problem from a viewpoint of pressure loss; therefore, there is a possibility that the flow rate comes to be small further, within the microreactor of an upper-step side.

Herein, it is also possible to bring the flow rate to be small in the upstream side thereof, by increasing a number of the microreactors for each step as it goes down to a lower-step side. However, since the number of the microreactors comes to be larger than that of the steps of the reactions, this can be considered not to be a practical method for dissolving, in particular, when the number of steps of reactions is large.

Third, it is that the structure of the microreactor becomes complicated if trying to increase the mixing performance. The more complicated in the structure of the microreactor, the more costs and times necessary for manufacturing thereof;

therefore, it is desirous to be simple in the structure, while maintaining the mixing performance as far as possible.

Fourth, it is that there is no microreactor system, for enabling the multi-step reaction with using the reactors mentioned above, and also being superior in operability thereof. It is possible to build up such the system for use of the multi-step reaction, as shown in FIG. 2, however it is clear that the operability thereof comes to be very bad, as the number of the steps of the reactions increases.

Then, according to the present invention, an object thereof is to provide a microreactor, having no necessity of providing the manifold therein, which is a cause of reason of the dead volume, and also having high mixing performance even if the flow rate is small. Further, other object is, according to the present invention, to provide a microreactor system, with which the multi-step reaction can implemented with using the microreactors mentioned above therein, and also being superior in the operability thereof.

Means for Dissolving the Problem(s)

For accomplishing the object(s) mentioned above, according to the present invention, first of all, there is provided a microreactor, having channels for mixing at least two (2) kinds of fluids, for mixing up the fluids through dividing of the fluids and combining the fluids divided, comprising in an inside thereof: (a) at least two (2) pieces of channels, which are formed within a certain plane, to introduce the fluids therein; (b) channels, which are formed on said plane, to combine the fluids introduced; (c) channels, which are configured so that the fluids combined change a flow path into a direction approximately parallel with a plane, on which a flow path of the fluids to be combined lies and also rectangular to the flow path of the fluids to be combined; (d) channels, which are formed within the plane, on which said channels lie, to divide the fluids combined into two (2) thereof; (e) channels, which are configured to change the flow path into a direction approximately parallel with the plane, on which said channel to divide, and approximately rectangular to said channel to divide, after each of the fluids divided flows into a direction near to the normal line; (f) channels, which are formed within the plane, on which said channels lie, to combine two (2) fluids divided in a direction approximately vertical or approximately parallel with respect to said plane; and (g) channels, which are configured to advance the combined fluids into a direction approximately parallel with a plane, on which said combined channels lie, and approximately rectangular to said combined channels lie, wherein each of said channels of (b) to (g) is formed in an inside of said microreactor, at least two (2) or more numbers thereof. Further, with such structure, it is possible to increase the mixing performance in spite of small flow rate, without proving the manifold, which is a cause of reason of the dead volume.

Also, according to the present invention, it is preferable that, within the microreactor as described in the above, said channels are formed by facing two (2) pieces of a plane-like plate, each of which has the channels, opposing to each other, and on an opposing surface of one of said plates are formed said channels of (a), (b), (e) and (f), while on an opposing surface of the other of said plate are formed said channels of (c), (d) and (g).

In addition thereto, according to the present invention, there is provided a microreactor system for combining at least three (3) kinds of fluids therein, comprising: a sending unit, which is configured to send said fluids; a reactor unit, which includes at least two (2) microreactors, each for reacting at least two (2) kinds of fluids therein; a temperature control unit, which is configured to execute temperature control of said reactor unit; and a control unit, wherein said sending unit, said reactor unit and said temperature control unit are controlled and monitored, said fluids are sent by a syringe and a syringe pump, which are included in said sending unit, said microreactors are provided in series directing from an upstream side to a downstream side, temperatures of said microreactors are controlled, separately, for each microreactor, through said temperature control unit, and said microreactor is that, which is described in the above. With such structure, it is possible to implement the multi-step reaction, easily, by applying such microreactor as was mentioned.

In addition thereto, according to the present invention, it is preferable that, within the microreactor as described in the above, at least one (1) kind of said fluids is sent by operating two (2) pieces of syringes, simultaneously, or said control unit executes at least two (2) operations, continuously, through instructing said at least two (2) operations to be executed continuously by said sending unit, in advance.

Effect(s) of the Invention

According to the present invention, there can be obtained a superior effect that a microreactor having high mixing performance in spite of small flow rate, without providing the manifold, which is a cause of reason of the dead volume, and further a microreactor system suitable for the multi-step reaction with applying that.

BRIEF DESCRIPTION OF THE DRAWINGS

FIGS. 8A and 8B are views for showing rotation of an interface between fluids within the microreactor according to the first embodiment (the embodiment 1) of the present invention, in particular, channel cross-sections for showing rotating conditions of the interface between the fluids (FIG. 8A) and conditions of rotations of the interface between the fluids on each channel cross-section when seeing from an upstream side to a downstream side (FIG. 8B);

DETAILED DESCRIPTION OF THE PREFERRED EMBODIMENTS

Hereinafter, embodiments according to the present invention will be fully explained by referring to the attached drawings.

First of all, explanation will be given on the structure of a microreactor system for use of multi-step reaction, applying a microreactor according to the present invention therein, by referring to FIG. 1 and FIGS. 3 and 4. However, in those figures will be shown the structures being applied only the cases of two (2)-step reaction, but those should not be limited only to that two (2)-step reaction.

Figure 1:
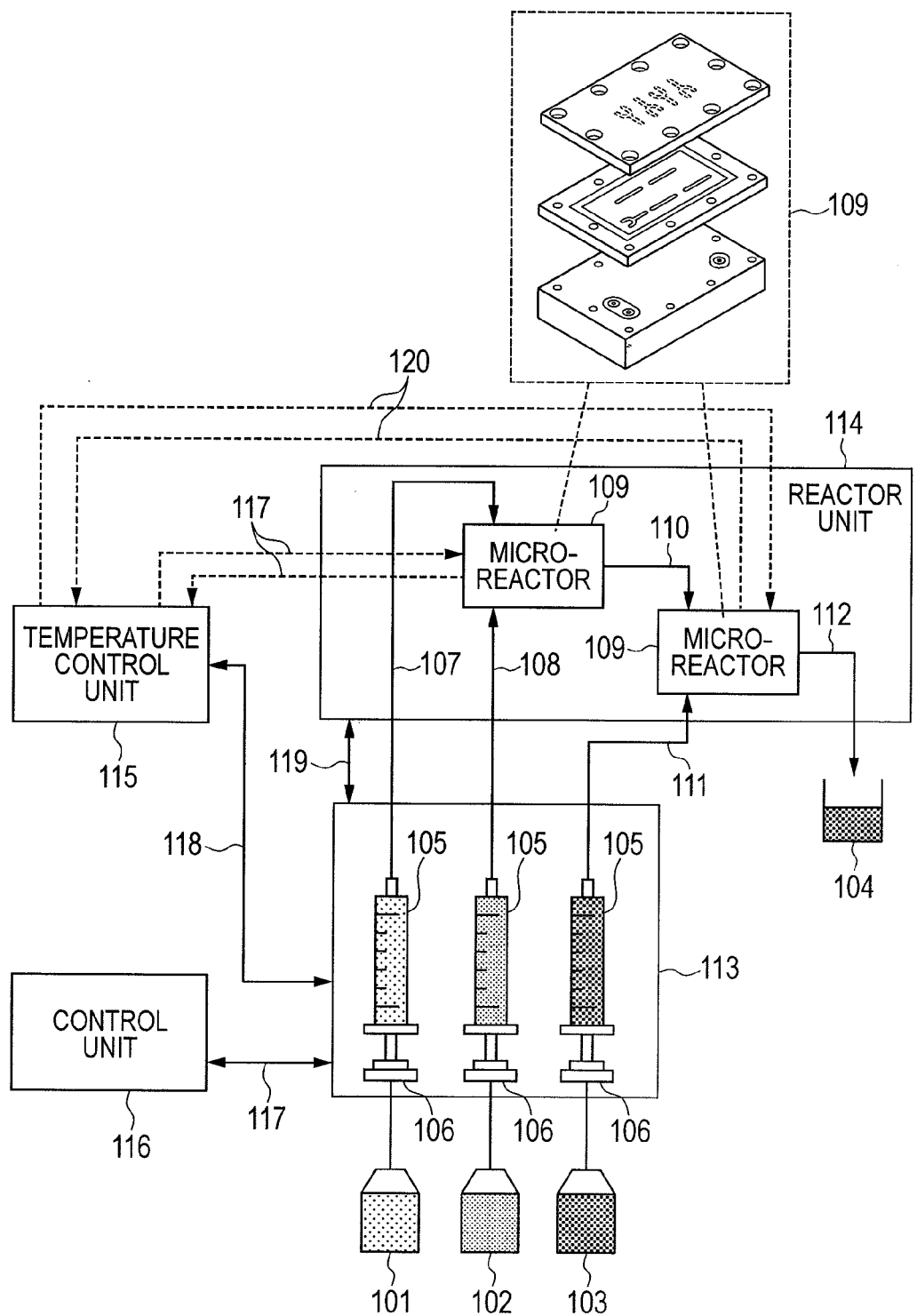
FIG. 1 is a view for showing an outlook configuration of a microreactor system for use in the multi-step reaction and a microreactor, according to an embodiment of the present invention.
Figure 2:
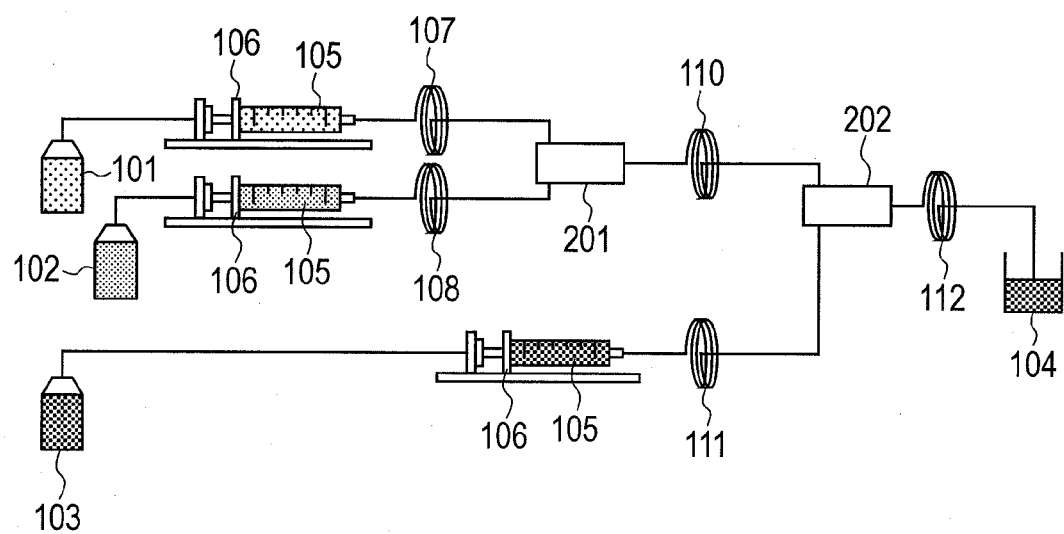
FIG. 2 is a block diagram for showing an outlook configuration of the microreactor system for multi-step reaction, relating to the present invention (in case of two (2)-step reaction)

Firstly, FIG. 1 is a view for showing the microreactor system for use of the multi-step reaction applying the microreactor according to the present invention therein. As is shown in the figure, the microreactor system for the multi-step reaction, according to the present invention, comprises a liquid sending unit 113 for sending a solution of reactant, a reactor unit 114 for loading microreactors therein, a temperature control unit 115 for managing temperature, and a control unit 116.

However, in the microreactor system shown in FIG. 1, a solution 101 of reactant 1 and a solution 102 of reactant 2 are introduced into a first-step microreactor 109 within the reactor unit 114, passing through an introducing portion 107 for the reactant 1 and an introducing portion 108 for the reactant 2, with using a syringe 105 and a syringe pump 106 within the liquid sending unit 113. Thereafter, passing through a reacting portion 110 of a first-step reaction, a solution of product of the first-step reaction is obtained, i.e., mixing/reacting between the solution of the reactant 1 and the solution of the reactant 2. Further, the solution of the product of the first-step reaction mentioned above (the reacting portion 110 of the first-step reaction) and a solution 103 of reactant 3, as well, are introduced into a second-step microreactor 109 within the reactor unit 114, passing through a introducing portion 111 for the solution of the reactant 3, with using the syringe 105 and the syringe pump 106 within the liquid sending unit 113. Thereafter, passing through a reacting portion 112 of a second-step reaction, a solution 104 of product is obtained, i.e., mixing/reacting among the three (3) kinds of solutions mentioned above, the solution of the reactant 1, the solution of the reactant 2 and the solution of the reactant 3.

Figure 3:
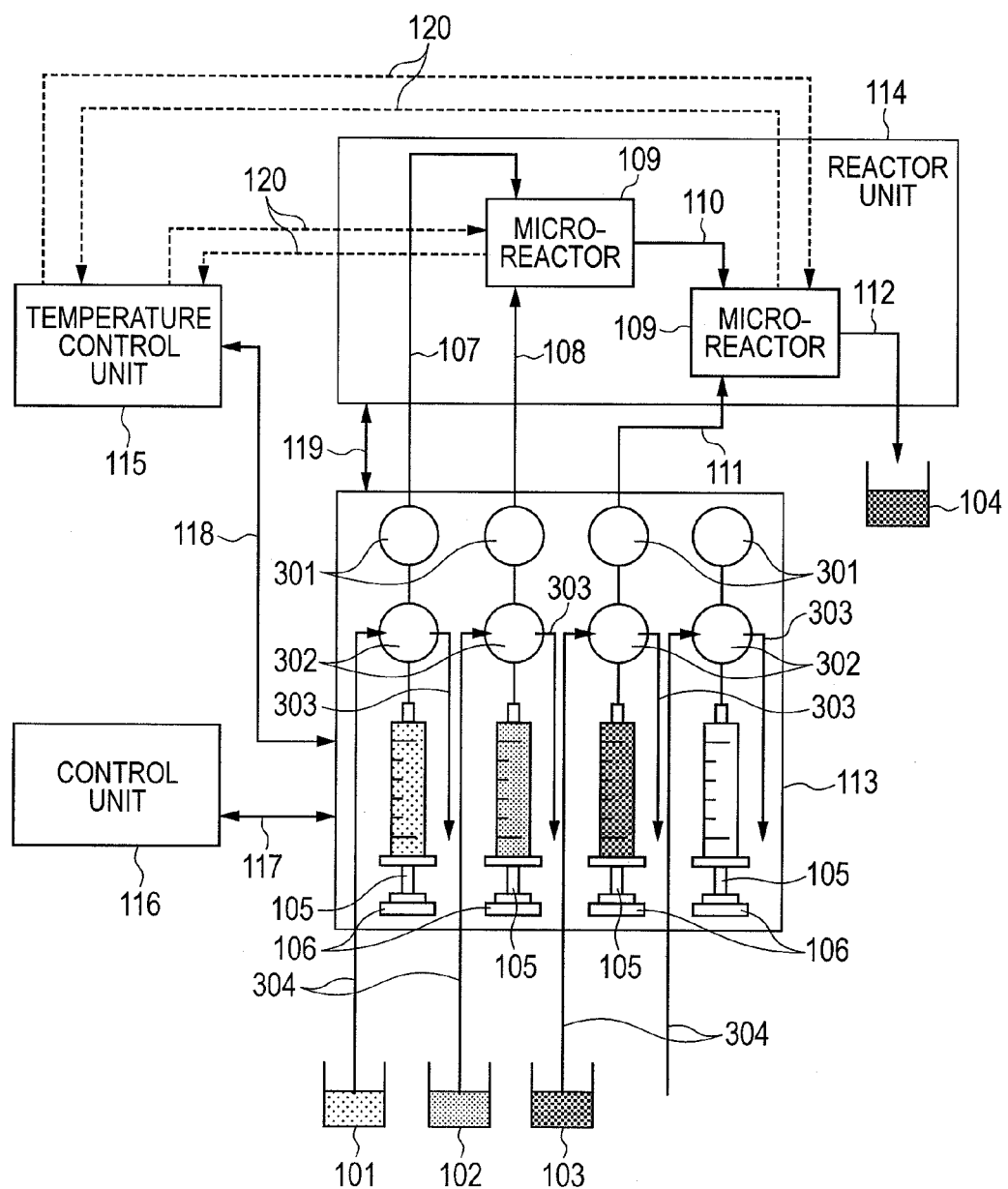
FIG. 3 is a view for showing an outlook configuration of the microreactor system for multi-steps, applying the microreactor according to the present invention mentioned above therein (in case of an intermittent sending)

Next, FIG. 3 attached herewith shows the microreactor system for the multi-step reaction applying the microreactor according to the present invention, which was already shown in FIG. 1 mentioned above, in particular, the details thereof in case where it is applied into an intermittent sending.

In the figure, the liquid sending unit 113 includes, within an inside thereof, a pressure sensor 301 for observing pressures within the system, a switching valve 302 for exchanging feeding/sending/wasting of solution, a wasting line 303, a feeding line 304, the introducing portion 107 for the solution of the reactant 1, the introducing portion 108 for the solution of the reactant 2, the syringe 105 and the syringe pump 106, and also, but not shown in the figure herein, a folder for fixing the syringe, an electric power source switch, an urgent stop switch for when an abnormal operation occurs, a connector for use of communication, and fittings for connecting the wasting line, the feeding line, the introducing portion of the solution of the reactant 1 and the introducing portion of the solution of the reactant 2, etc.

Although FIG. 3 mentioned above shows the case where the liquid sending unit 113 equips four (4) sets of syringes in an inside thereof, but the number of the syringes may be determined depending on the necessity for implementing a predetermined reaction(s), and should not be limited to the number of the syringes shown in the figure. Also, as will be mentioned later, for example, it is possible to increase the number of the syringes, by means of an additional liquid sending unit including two (2) sets of syringes as a unit. However, in the case of the system shown in this FIG. 3, if sending out the solution within the syringe, completely (e.g., uses up), since the solution must be sucked from the feeding line 304 thereafter, therefore it takes a time of a certain degree. For that reason, as a matter of facts, the reaction is implemented with using the intermittent feeding.

Also, within the reactor unit 114, the microreactors 109 are connected in series. Thus, the microreactor 109 for use of the first-step reaction is connected through the fitting, not shown in the figure herein, together with the introducing portion 107 for the solution of the reactant 1, the introducing portion 108 for the solution of the reactant 2 and the reacting portion of the first-step reaction. On the other hand, the microreactor 109 for use in the second-step reaction is connected through the fitting, not shown in the figure herein, together with the reacting portion 110 for the first-step reaction, the introducing portion 111 for the solution of the reactant 3 and the reacting portion 112 for the second-step reaction. However, as the microreactor, there may be applied a microreactor available on the market, a T-tube, or a Y-tube, etc., other than the microreactor according to the present invention, which will be mentioned in details thereof, hereinafter.

The temperature control unit 115 is able to control the temperature of each microreactor, respectively, by conducting control of the temperature and feedback for the reactor unit 114. As a method for adjusting temperature, there are already known a method of circulating a heat medium with using a temperature-controlled unit, a method of applying a Peltier device, etc. Also, as a target to be controlled on the temperature thereof, respectively, there can be listed up, for example, the heat medium circulating around a periphery of the microreactor, an outside or an inside of the microreactor, etc., however, it is possible to control the temperature finely much more, by taking the fluid actually flowing or a place close to the fluid actually flowing, as the target of that control.

Further, the three (3) units mentioned above are observed/ operated by the control unit 116. Firstly, the liquid sending unit 113 is observed/operated by the control of the liquid sending unit, which is shown by an arrow herein, and a control and feedback of liquid sending unit 117. Further, the reactor unit 114 and the temperature control unit 115 are observed/ operated, respectively, through data communication 119 between the reactor unit and the liquid sending unit and data communication 118 between the temperature control unit and the liquid sending unit, which are also shown by arrows, respectively, i.e., via the liquid sending unit 113.

In more details, the control unit 116 switches the switching valve 302 within the liquid sending unit 113 and also actuates the syringe 105 through the syringe pump 106, thereby executing an operation, such as, introducing the solution into the syringe or sending it, and further an operation of wasting the solution within the syringe into a waste tank (not shown in the figure) or the like. And, it is also able to stop the liquid sending operation or the introducing (or feeding) operation on the way thereof, or start it again.

And, with the control unit 116, it is possible to set up the size of each syringe, an introducing volume and an introducing velocity from the feeding line 304, a sending volume and a sending velocity to the reactor unit 114, a sending volume and a sending velocity to the wasting line 303, and temperature of the microreactor, i.e., reacting temperature. And, it is also possible to set up "delay time" when sending a rinse solution after completion of the reaction, or when suppressing an amount used Further, in relation with the operations of the syringes and the operations of the valves accompanying with introducing/ sending processes, an input file, for instructing two (2) or more numbers of operations to be continued with, is produced in advance, and this file is executed by that control unit 116 reading it therein; thereby, it is also possible to operates the operations mentioned above as a series of operations or works, continuously. And, it is also possible to set that control unit 116 to read such the file therein, so as to operate when necessary, while reserving it within, and further to rewrite the content of that file appropriately.

And, the control unit 116 is able to record the information of temperature, which can be obtained from the temperature control unit 115, the data of pressures within the system, which can be obtained from the pressure sensors 301, and further the data of times, etc., therein. Also, the control unit 116 determines threshold values for the pressures within the system, in advance, from resistance to pressure of the pressure sensors and/or the exchange valves, etc., and it stops the system as a whole, urgently, when the pressure within the system exceeds that threshold value.

Herein, about a material of the feeding line 304, the wasting line 303, introducing portion 107 for the solution of the reactant 1, the introducing portion 108 for the solution of the reactant 2, the reacting portion 110 for the first-step reaction, the reacting portion 112 for the second-step reaction or the microreactor 109, etc., it may be any one as far as it gives no ill influence upon the reactions to be conducted, and can be changed, appropriately, depending on the temperature and/or the physical properties of the solution flowing in an inside thereof. As such material, the followings can be listed up, for example, stainless, silicon, glass, Hastelloy®, silicon resin, fluorine resin, etc. And, in addition thereto, it is also possible to apply so-called a material increasing the corrosion resistance, such as, glass lining, stainless, or silicon, upon the surface of which is treaded a coating of nickel or gold or the like, or silicon, the surface of which is oxidized.

Figure 4:
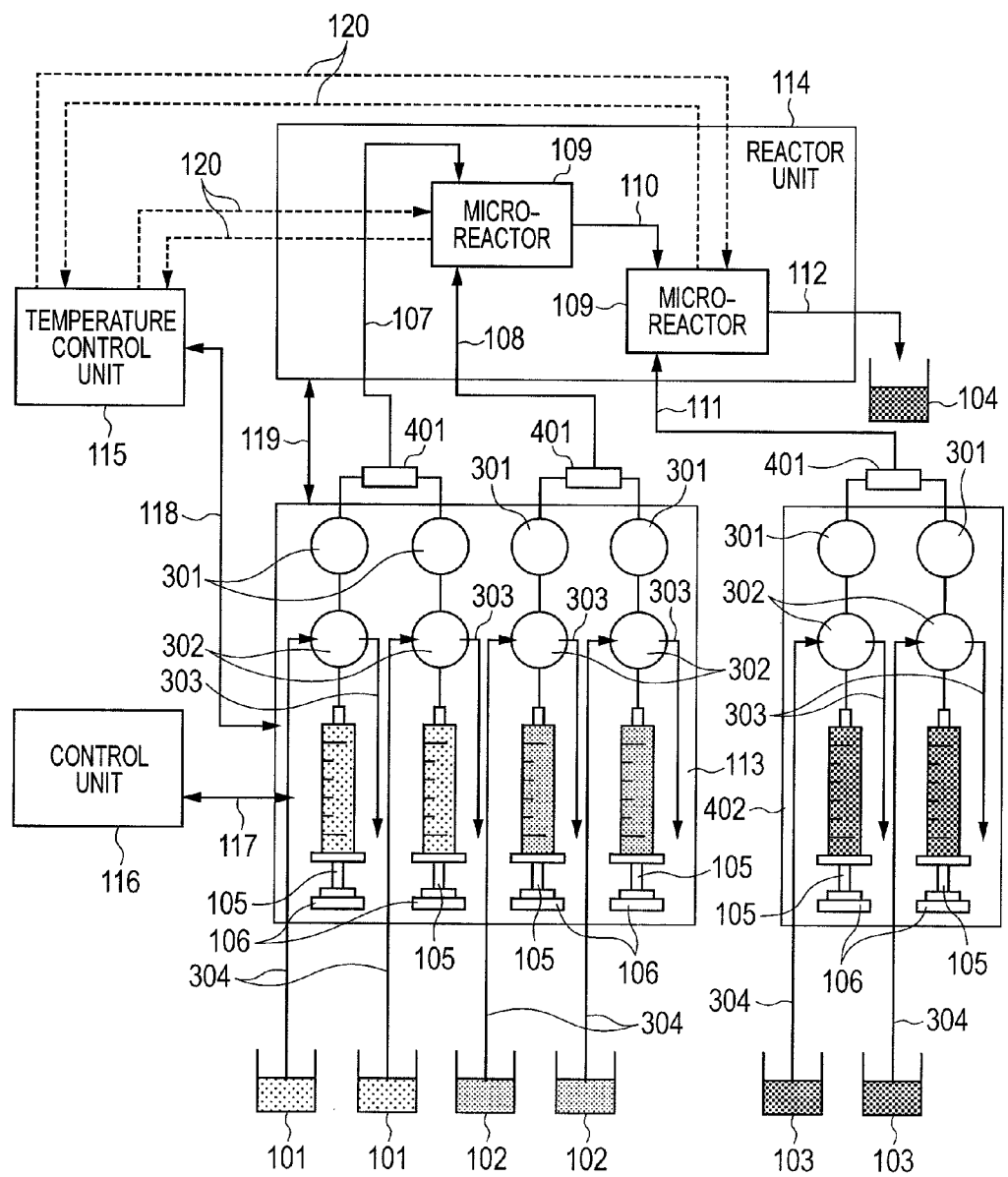
FIG. 4 is a view for showing an outlook configuration of the microreactor system for multi-steps, applying the microreactor according to the present invention mentioned above therein (in case of a continuous sending)

FIG. 4 is a view for showing the details of the microreactor system for the multi-step reaction with using the microreactors according to the present invention, in particular, in case where it is applied into a continuous sending of liquid.

When conducting the intermittent sending, as in the microreactor system shown in FIG. 3 mentioned above, the liquid of a volume within the first system must be wasted as the dead volume, always after sending out the liquid within the syringe, and therefore, there may be cases of generating harmful effects in obtaining experimental data, such as, when sending an expensive reactant, when the sending velocity is very slow. Also, when applying a result obtained by the microreactor in an actual production line, continuous operation of the apparatus and/or an estimation on the continuous production is/are essential.

In the embodiment shown in this FIG. 4, two (2) pieces of syringes are connected by a T-connector 401 as one set, and this is connected with the microreactor, wherein in such structure, the following operations are repeated; i.e., when sending is finished from one syringe, it is continued by the other syringe, and at the same time, introducing of the reactant is made into an empty syringe. With doing this, it is possible to achieve the continuous operation without interruption in the liquid sending operation. However, this operation is conducted continuously as a series of operations or works. With such operation, it is sufficient to waste the liquid of the dead volume of only one (1) time, at first. And, it is also possible to send the liquid when this dead volume is larger than the volume of one (1) piece of syringe.

Also, in case of a two (2)-step reaction, if adopting such method for continuously sending of liquid, six (6) pieces of the syringes are necessary in total. In FIG. 4 mentioned above, the number of pieces of the syringes within the liquid sending unit 113 is four (4), however if applying the so-called additional liquid sending unit 402 including two (2) pieces of syringes as a unit, for example, it is possible to re-construct the microreactor system depending on the necessity thereof.

With using the additional liquid sending unit 402 mentioned above, it is possible to apply this microreactor system into the case of the intermittent sending of liquid, too, in the similar manner to that of the continuous sending of liquid, and also into the multi-step reaction more than the three (3)-step reaction. However, in the explanation of the microreactor system according to the embodiment of the present invention, which was given in the above, although there are used the expressions upon an assumption that the liquids react; however, the microreactor system according to the present invention can be applied into the case where the reaction does not proceed in an inside thereof, i.e., a multi-step mixing of solutions. Further, the microreactor system according to the present invention can be also applied, in the similar manner, into the cases when conducting a quench reaction continuously after reacting, when reacting continuously after mixing, or when the mixing and the reaction are necessary alternately. In addition thereto, the microreactor system according to the present invention can be applied into, not only a homogeneous system for mixing up with each other, but also an in homogeneous system, such as, an emulsification process not mixing up with each other, representatively, in the similar manner.

Embodiment 1

Following to the above, explanation will be given on the structure of the microreactor 109 according to the present invention, in particular, the structure thereof according to a first embodiment (an embodiment 1), in more details thereof, by referring to FIGS. 5 to 11 attached herewith.

Figure 5:
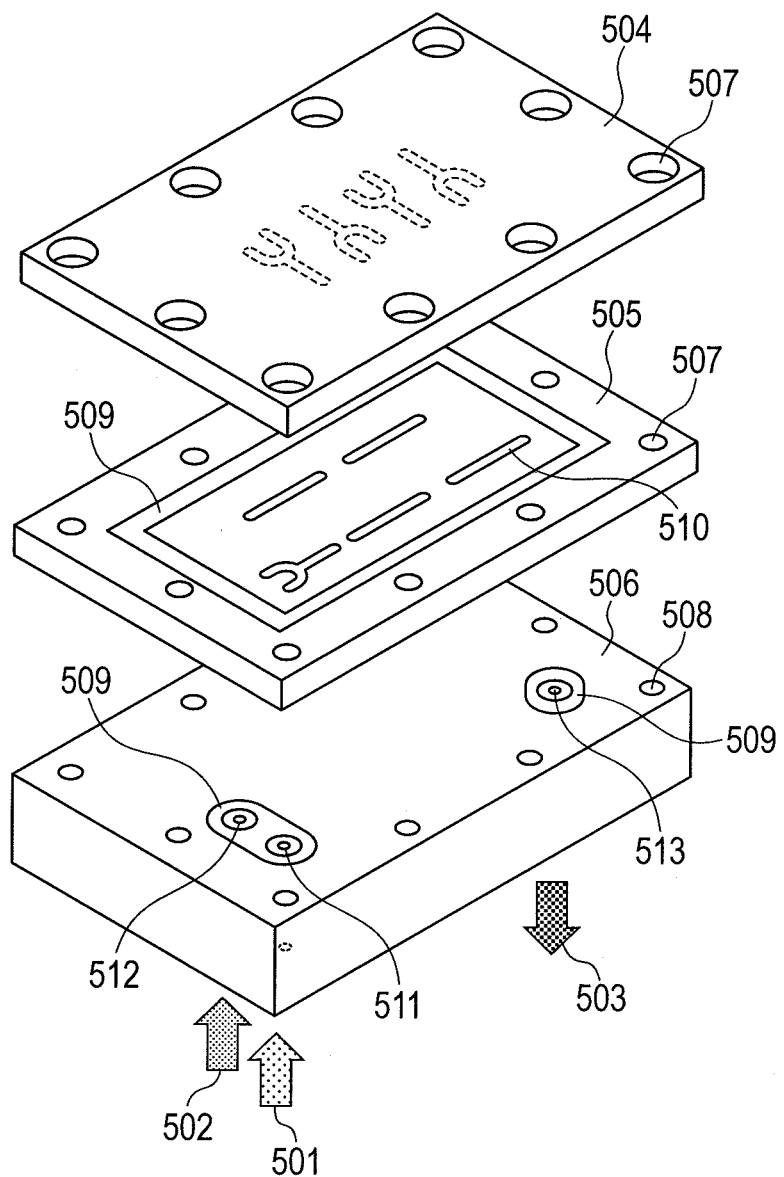
FIG. 5 is an assembling view of the microreactor according to a first embodiment (an embodiment 1) of the present invention.

First of all, FIG. 5 shows an exploded perspective view of the microreactor, according to the embodiment 1 of the present invention, and FIG. 6 shows a channel forming plate for building up the structure of that microreactor.

Figure 6A:
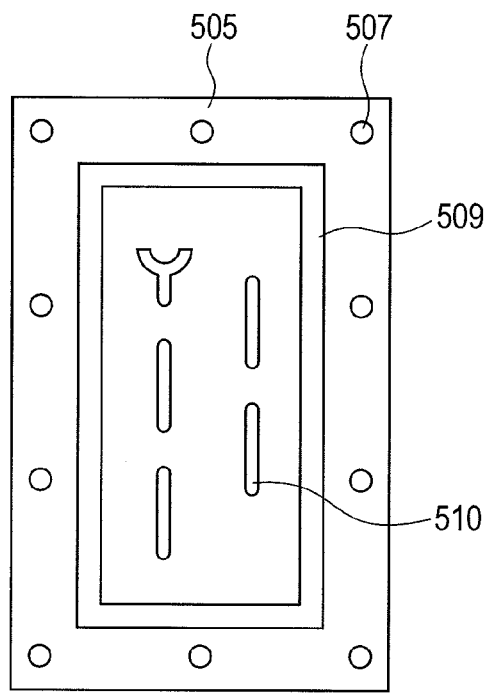
FIGS. 6A and 6B are views for showing channel forming plates of the microreactor according to the first embodiment (the embodiment 1) of the present invention.
Figure 6B:
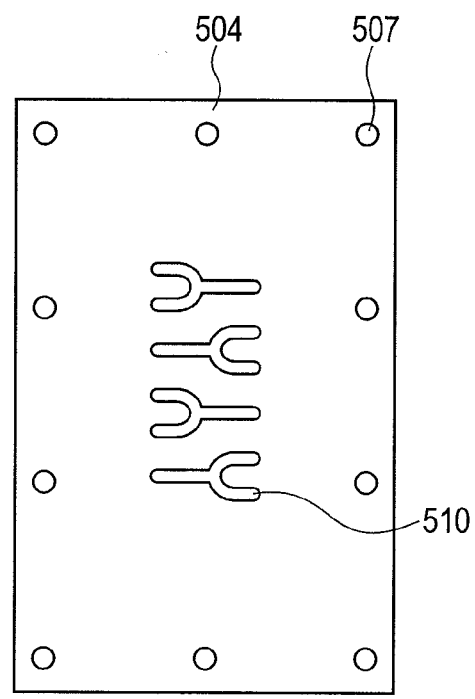

As is shown in FIG. 5, the microreactor according to the embodiment 1 of the present invention is made up with an upper-side plate 504, a lower-side plate 505 and a holder plate 506, i.e., three (3) pieces of plates in total. For those three (3) pieces of plates, packing not shown in the figure is inserted into a packing groove 509, each being formed on a surface thereof, respectively, and they are fixed by screws not shown in the figure, through a screw clamp, with using a screw hole 507 and a thread cutting 508; thereby it is possible to make up a microreactor having high sealing properties. Also, as is shown in FIGS. 6A and 6B, a channel 510 is built up by combining the channel 510, which is formed on the surface of the upper-side plate 504 (FIG. 6B) and the channel 510, which is formed on the surface of the lower-side plate 505 (FIG. 6A).

Herein, in FIG. 5, again, a solution 501 of reactant A and a solution 502 of reactant B are introduced from an inlet 511 for the solution of reactant A and an inlet 512 for the solution of reactant B, respectively therein, and thereafter, they are discharged from an outlet 513 for the solution of product, passing through the channel 510, and thereby a product solution 503 can be obtained through mixing/reacting between the solution of reactant A and the solution of reactant B.

However, on the reverse side of the holder plate 506 are formed the inlet 511 for the solution of reactant A and the inlet 512 for the solution of reactant B mentioned above, and further a thread-cut processing (not shown in the figure) is treated, so that fitting (not shown in the figure) for use of connection with a tube, not shown in the figure herein, can be connected with, corresponding to the outlet 513 for the solution of product. Further, in this instance, if treating such the thread-cut processing that the fitting of a flat-bottom type can be connected with, for example, it is possible to elongate a terminal of the introducing portion connected with the sending pump and/or a terminal of the reacting portion connected with the microreactor of previous step so as to reach the inlet 511 for the solution of reactant A and the inlet 512 for the solution of reactant B, and further to the outlet 513 for the solution of product, and with this, it is possible to reduce the dead volume when introducing the solution of reactant A and the solution of reactant B, as small as possible.

Herein, as a material of the upper-side plate 504, the lower-side plate 505 and the holder plate 506, it may be any one as far as it gives no ill influence upon the reactions to be conducted, and can be changed, appropriately, depending on a kind of the reaction. As such material can be applied, for example, stainless, silicon, gold, Hastelloy, silicon resin or fluorine resin, etc. Or, there may be applied so-called a material increasing the corrosion resistance, such as, glass lining, stainless, or silicon, upon the surface of which is treaded a coating of nickel or gold or the like, or silicon, the surface of which is oxidized.

And, a material of the packing mentioned above (but, not shown in the figure) may be any one as far as it gives no ill influence upon the reactions, and can be changed, appropriately, depending on a kind of the reaction. For example, silicon resin, fluorine resin or the like can be applied.

Also, though the microreactor shown in FIG. 5 mentioned above has the structure decomposable, by assembling it with using the packing and the screws; however, the present invention should not be limited only to this, but it is also possible to obtain the structure indecomposable, for example, by connecting the three (3) pieces of plates mentioned above through diffused junction, etc. Further, with such the structure decomposable as was mentioned above, since those plates can be discomposed and rinsed, in case where blocking occurs in an inside thereof, for example, it is preferable to improve a maintenance property thereof.

Figure 7A:
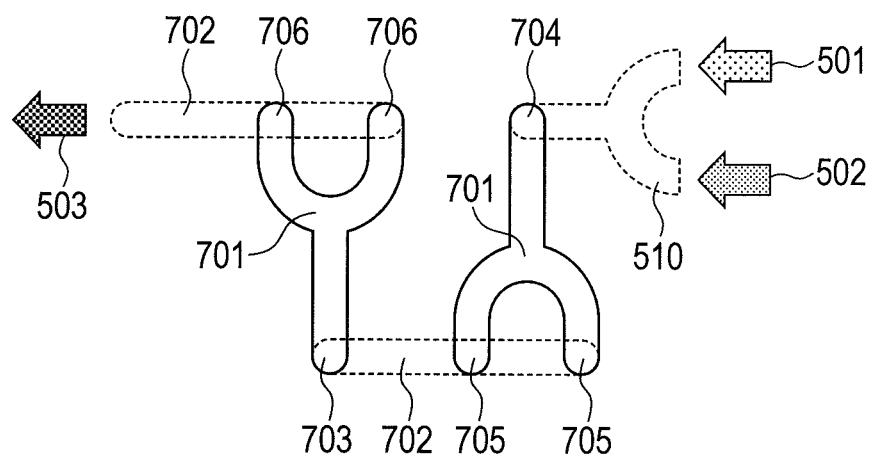
FIGS. 7A and 7B are a plane view (FIG. 7A) and a perspective view (FIG. 7B) for showing channel configuration of the microreactor according to the first embodiment (the embodiment 1) of the present invention.
Figure 7B:
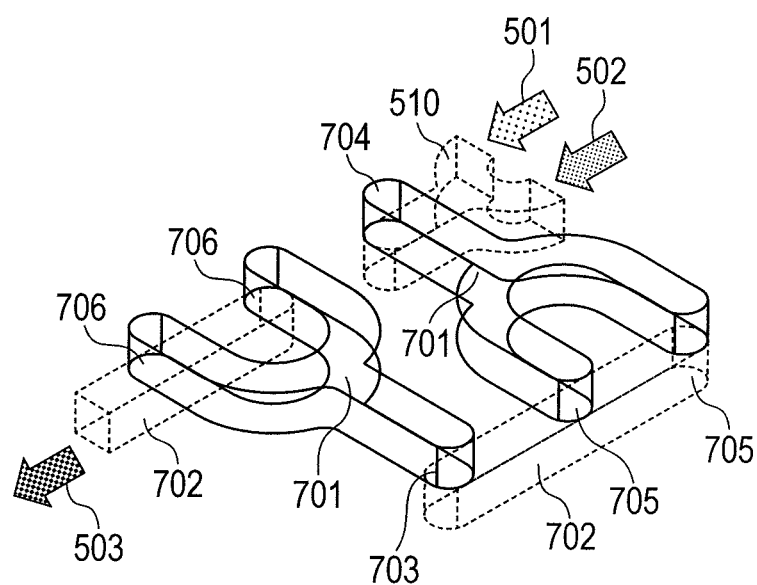

Following thereto, FIGS. 7A and 7B are a plane view (FIG. 7A) and a perspective view (FIG. 7B) for showing the channel configuration of the microreactor mentioned above.

As is apparent from the figures, the channel 510 within the microreactor according to the present invention is built up with an upper-side portion (shown by solid lines in the figure) and a lower-side portion (shown by broken lines), and this channel has such configuration as below. For example, fluid of the solution 501 of reactant A and fluid of the solution 502 of reactant B move from a lower-side channel to an upper-side channel, i.e., in direction of the normal line, at a channel changing portion 704, and also they are changed into the direction perpendicular to that of an upstream-side channel (into the left direction in the present example). Thereafter, the fluids mentioned above are divided into the left-hand side and the right-hand side at a channel dividing portion 701, and further conduct the movement into the normal-line direction from the upper side to the lower side as well as alternation of the direction of the route thereof (into the right direction in the present example). And, after being combined with up and down at a channel combining portion 702, the fluids move, again, into the normal-line direction, i.e., from the lower-side channel to the upper-side channel, at a channel changing portion 703, and also change the route into the right direction, perpendicular. And, such the channel as was mentioned above is formed, repetitively, in an inside of the above-mentioned microreactor.

Thus, in the inside of the microreactor, the solution 501 of reactant A and the solution of reactant B are mixed with, quickly, through the channels mentioned above, and finally, the product solution 503 can be obtained through the mixing/reacting between the solution of reactant A and solution of reactant B.

However, with the number of repetition of the division/mixture of the solutions within the microreactor mentioned above, it would be apparent for the person skilled in the art that it should not be limited to that of the channel configuration shown in FIGS. 7A and 7B, but can be changed, appropriately, depending on the physical properties of the solutions to be used and/or a reaction time thereof, etc.

Next, FIGS. 8A and 8B are views for showing rotation of an interface between the fluids within the channels of the microreactor according to the embodiment 1 mentioned above, and in particular, FIG. 8A shows positions of channel cross-sections A-G, which are determined from the upstream side to the downstream side, sequentially, within the channels, while FIG. 8B shows the condition of rotation on the interface between the fluids in the channel cross-sections A-G mentioned above, within the channels of the microreactor.

First of all, explanation will be given on the rotation of the interface between the fluids. Herein, consideration is given on the case when changing the route into the right direction, perpendicular, while directing to the direction of the route into the upstream side. When moving into the normal-line direction from the lower-side channel to the upper-side channel, the fluid having a linear interface flows with rotating that interface by 90 degrees into the right direction in the downstream side. On the other hand, when moving into the normal-line direction from the upper-side channel to the lower side channel, the fluid having the linear interface flows with rotating that interface by 90 degrees into the left direction in the downstream side. However, it is already known that an angle defined between the route into the upstream side and the route into the downstream side comes to be equal to an angle of rotation of the interface, in this manner, when the Reynolds number is less than 2, approximately, and actually, an angle of rotating the interface depends on the viscosity and/or the density of the fluid, and further on the sending velocity of liquid and width and/or depth of the channel.

On the other hand, when dividing the fluid, in particular, in the case where a volume ratio is not 1:1 between the solution of reactant A and the solution of reactant B, it is preferable to divide perpendicular to the interface between the fluids. This is because, the reaction progresses even during the time-period from dividing to combining, and therefore, even during that time-period, it is necessary to keep the reactant A and the reactant B at a predetermined equivalent ratio.

Also, even when the volume ratio between the reactant A and the reactant B is 1:1, if dividing the fluid obliquely with respect to the interface thereof, the reactant A and the reactant B do not come to the predetermined equivalent ratio, therefore there is a possibility the reaction will not proceed at the equivalent ratio targeted. Also, when dividing the fluid on the interface thereof, one of the fluids comes to the solution of reactant A while the other the solution of reactant B, and for that reason, there is a possibility the reaction will not proceed during the time-period when dividing.

Following to the above, in FIG. 8B, it is assumed that the solution 501 of reactant A and the solution 502 of reactant B are fluids defining the interface between them (i.e., not mixed up with each other, completely), and that they are introduced at the volume ratio 1:1. As is shown in this FIG. 8B, firstly, just after the solution 501 of reactant A and the solution 502 of reactant B are introduced, they define a fluid positioning the solution 501 of reactant A and the solution 502 of reactant B at the left-hand side and the right-hand side, being divided from each other within the channel (see the channel cross-section A). And, it moves into the normal-line direction from the lower-side channel up to the upper-side channel, and also changes the route into the left direction perpendicular to the channel direction of the upstream side thereof, with rotating the interface between the fluids in the left direction by 90 degrees, and thereby defining a fluid positioning the solution 501 of reactant A and the solution 502 of reactant B up and down, being divided from each other (see the channel cross-section B). Thereafter, the fluid is divided into the left and right directions. Further, each of the fluids divided come to a fluid, in which the solution 501 of reactant A and the solution 502 of reactant B defines the fluids are positioned up and down (see the channel cross-section C). Thereafter, each of the fluids divided moves into the normal-line direction from the upper-side channel down to the lower-side channel, respectively, and also changes the route thereof into the right-hand side direction perpendicular to the channel direction of the upstream side. With this, although the fluids are rotated into the left direction by 90 degrees, however since they are combined with in such a manner that one of the fluids divided covers on the other fluid divided, then the solution 501 of reactant A and the solution 502 of reactant B define a fluids, in which they are positioned at the left-hand side and the right-hand side, being divided from each other (see the channel cross-section D).

Further, the fluid moves into the normal-line direction, from the lower-side channel up to the upper-side channel, and also changes the route into the right direction perpendicular to the channel direction of the upstream side, i.e., changing into the right direction by 90 degrees, and thereby the solution 501 of reactant A and the solution 502 of reactant B define a fluid, in which they are positioning up and down, being divided (see the channel cross-section E).

Thereafter, the fluid is divided into the left and right directions, and each of the fluids divided define a fluid, in which the solution 501 of reactant A and the solution 502 of reactant B are positioning up and down, being divided from each other (see the channel cross-section F). Thereafter, each of the fluids divided moves into the normal-line direction from the upper-side channel down to the lower-side channel, and also changes the route into the left direction perpendicular to the channel direction of the upstream side, i.e., the fluid is rotated into the right direction by 90 degrees; however, since they are combined with in such a manner that one of those divided covers on the other one divided, again, then the solution 501 of reactant A and the solution 502 of reactant B define a fluid, in which they are positioned at the left-hand side and the right-hand side, being divided (see the channel cross-section G).

Herein, in FIG. 8B mentioned above, it is assumed that the solution 501 of reactant A and the solution 502 of reactant B to be introduced are fluids, which define the interface between them (i.e., not mixed up with each other, completely); however, in actual, the fluids are mixed up in the processes of repeating dividing/combining thereof. Accordingly, it can be considered, after dividing/combining thereof, by moving the fluids into the normal-line direction from the lower-side channel to the upper-side channel, and changing the route into a rectangular direction with respect to the direction of the passage of the upstream side, that the solution 501 of reactant A and the solution 502 of reactant B define the fluids being positioned up and down being divided, necessarily, before the fluids are divided, and therefore dividing/combining is/are generated on the fluids, effectively, and those solutions are mixed up with, gradually.

Figure 9A:
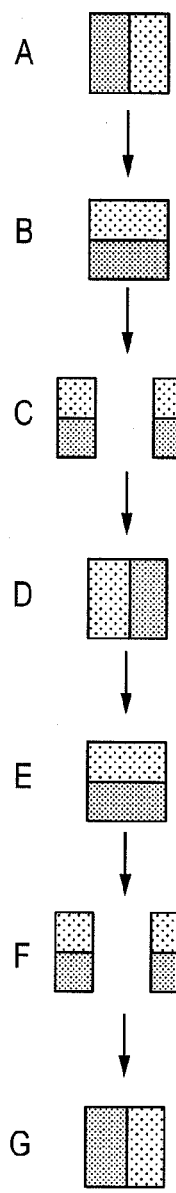
FIGS. 9A-9C are views for comparing the rotations of the interface between the fluids within the microreactor according to the first embodiment (the embodiment 1) of the present invention, in particular, the rotating condition of the interface on the channel cross-section when the interface rotates 90 degrees, when the fluids move into a normal-line direction and also change the route thereof into a rectangular direction with respect to a channel direction of an upstream side (FIG. 9A), the rotating condition of the interface on the channel cross-section when the interface rotates 45 degrees, and the rotating condition of the interface when the interface does not rotate, respectively, on the channel cross-sections in FIG. 8A for showing the rotating conditions of the interface between the fluids.
Figure 9B:
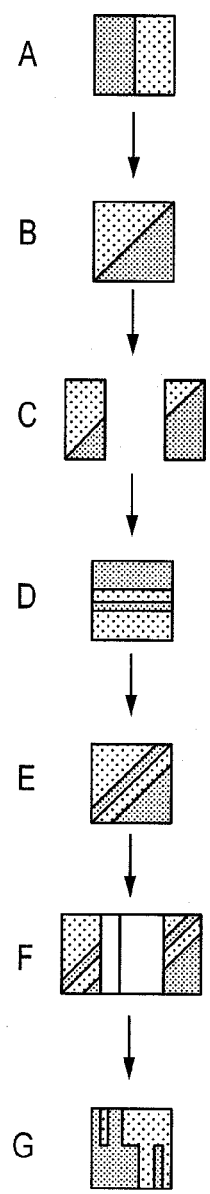
Figure 9C:
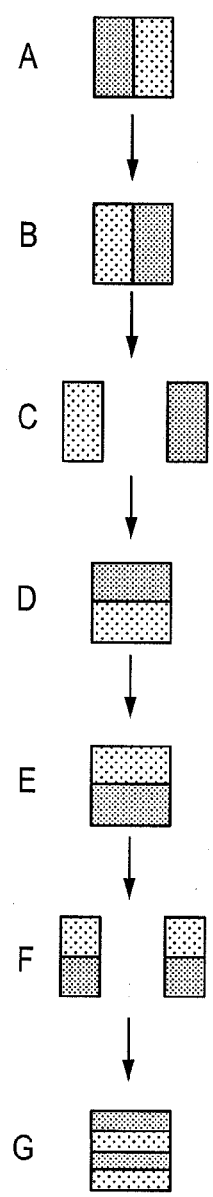

As was mentioned previously, the rotating angle of the interface depends on the viscosity and/or the density of the fluid, the sending velocity of the liquid, and/or the width and/or the depth of the channel, etc. FIGS. 9A-9C are views for comparing the rotation of the interface between the fluids within the microreactor according to the embodiment 1 mentioned above, wherein the channel cross-sections are similar to the channel cross-sections A-G shown in FIG. 8A mentioned above, and they shows the conditions when the fluids move into the normal-line direction between the upper and the lower channels, and change the route thereof into the rectangular direction with respect to the channel direction of the upstream side. In particular, FIG. 9A shows the condition where the interface rotates by 90 degrees (similar to that shown in FIG. 8B mentioned above), FIG. 9B the condition where the interface rotates by 135 degrees, and FIG. 9C the condition where the interface rotates by 180 degrees, respectively. Those shown in FIGS. 9B and 9C correspond to the case where the Reynolds number comes to be large and so that ill influences appear due to the rotation of the fluids. However, herein, similar to that shown in FIGS. 8A and 8B, it is assumed that the solution 501 of reactant A and the solution 502 of reactant B are fluids, which define the interface between them (i.e., not mixed up with each other, completely).

As is shown in FIG. 9B, in case where the interface is rotated by 135 degrees, when the fluids move into the normal-line direction between the upper and the lower channels and change the route into the rectangular direction with respect to the channel direction of the upstream side, first of all, just after being introduced, the solution 501 of reactant A and the solution 502 of reactant B define a fluid, in which they are positioned at the left-hand side and the right-hand side (see the channel cross-section A). And, when they move into the normal-line direction from the lower-side channel to the upper-side channel, and also change the route into the left direction perpendicular to the channel direction of the upstream side, then the interface is rotated into the left direction by 135 degrees, i.e., the solution 501 of reactant A and the solution 502 of reactant B define the fluids positioning in the diagonal-line direction (see the channel cross-section B). Thereafter, the fluid is divided into the left and right directions, and in each of the fluids divided, the solution 501 of reactant A and the solution 502 of reactant B define the fluids positioning in an oblique direction (see the channel cross-section C). Thereafter, when each of the fluids divided moves into the normal-line direction from the upper-side channel to the lower-side channel, and also changes the route into the right direction perpendicular to the channel direction of the upstream side, then the interface is rotated in the left direction by 135 degrees; however, since they are combined with in such a manner that one of the fluids divided covers on the other fluid divided, the solution 501 of reactant A and the solution 502 of reactant B define a fluid, in which they are positioned up and down with each other, i.e., the fluids of four (4)-layers (see the channel cross-section D).

Further, when moving into the normal-line direction from the lower-side channel to the upper-side channel, and also changing the route into the right direction perpendicular to the channel direction of the upstream side, the fluid is rotated into the right direction by 135 degrees, and thereby the solution 501 of reactant A and the solution 502 of reactant B are positioned in the diagonal-line direction with each other, i.e., the fluids of four (4)-layers (see the channel cross-section E).

Thereafter, the fluid is divided into the left and right directions, and each of the fluids divided defines a fluid of four (4) layers, in which they are positioned in the diagonal direction with each other (see the channel cross-section F). Thereafter, when each of the fluids divided moves into the normal-line direction from the upper-side channel to the lower-side channel, and changes the route into the left direction perpendicular to the channel direction of the upstream side, the fluid is rotated into the left and the right directions by 135 degrees; however, since they are combined with in such a manner that one of the fluids divided covers on the other fluid divided, again, they define a fluid positioning the fluids of four (4) layers, in each of which the solution 501 of reactant A and the solution 502 of reactant B are positioned at the left and the right directions with each other, up and down (see the channel cross-section G).

By repeating the processes mentioned above, thus, in the case of assuming that the interface is rotated by 135 degrees, when the fluid(s) move(s) into the normal-line direction between the upper and the lower of the channels and also change the route into the rectangular direction with respect to the channel direction of the upstream side, in particular, when the fluid is divided, it can be seen that there are cases where the solution 501 of reactant A and the solution 502 of reactant B define a fluid, in which they are positioned in the diagonal-line direction with each other, where they are positioned at the left and the right sides, and where they are positioned up and down, and they also repeat among of those.

As was mentioned above, in FIG. 9B, although it is assumed that the solution 501 of reactant A and the solution 502 of reactant B are fluids defining the interface between them (i.e., not mixed up with each other, completely); however, in actual, similar to that shown in FIG. 8B (or, FIG. 9A), they are mixed up in the processes of repeating dividing/combining of the fluids. Accordingly, it can be seen that, after dividing/combining of the fluids, by moving the fluids into the normal-line direction from the lower-side channel to the upper-side channel, and changing the route thereof into a rectangular direction with respect to the direction of the passage of the upstream side, there are cases where the solution 501 of reactant A and the solution 502 of reactant B define a fluid, in which they are positioned in the diagonal direction and where they define a fluid, in which they are positioned up and down direction, necessarily, before the fluid is divided, and also since the number of the layers thereof increases, gradually, therefore the mixing is promoted.

However, in case where the solution 501 of reactant A and the solution 502 of reactant B define the fluid, in which they are positioned in the diagonal direction before being divided, there is a concern that solution 501 of reactant A and the solution 502 of reactant B break a balance of the ratio of flow rates; however, since it is possible to shorten the time period from the mixing up to the combining, sufficiently, by enlarging the flow rate sufficiently or reducing the channel volume from the dividing of the fluid up to the combining thereof, for example, it can be considered that no serious problem occurs, in relation to the control of the reacting time.

On the other hand, as is shown in FIG. 9C, in case where the interface between the fluids is rotated by 180 degrees, even if the fluid moves into the normal-line direction between the upper-side and the lower-side channels and also changes the route thereof in the rectangular direction with respect to the channel direction of the upstream side, first of all, just after when the solution 501 of reactant A and the solution 502 of reactant B are introduced, they defined a fluid, in which the solution 501 of reactant A and the solution 502 of reactant B are positioned at the left-hand and the right-hand sides (see the channel cross-section A). And, although it moves into the normal-line direction from the lower-side channel up to the upper-side channel and also changes the route into the left direction perpendicular to the channel direction of the upstream side; however, since the interface between the fluids is rotated into the left direction by 180 degrees, although an order of the solution 501 of reactant A and the solution 502 of reactant B is exchanged, herein, but they define a fluid keeping the positions thereof at the left and the right sides with each other (see the channel cross-section B). Thereafter, the fluid is divided into the left and the right directions, and one of the fluids divided is the solution 501 of reactant A while the other is the solution 502 of reactant B (see the channel cross-section C). Thereafter, each of the fluids divided moves into the normal-line direction from the upper-side channel to the lower-side channel and also change the route into the right direction perpendicular to the channel direction of the upstream side; however, herein also the interface is changed into the left direction by 180 degrees, and the fluids are combined with in such a manner that one of the fluids divided covers on the other of the fluids divided, and therefore they define a fluid, in which the solution 501 of reactant A and the solution 502 of reactant B are positioned up and down with each other (see the channel cross-section D).

Further, the fluid moves into the normal-line direction from the lower-side channel up to the upper-side channel and also changes the route into the right direction perpendicular to the channel direction of the upstream side, and the interface between the fluids is rotated into the right direction by 180 degrees (see the channel cross-section E). Thereafter, the fluid is divided into the left and the right directions, and each of the fluids divided defines a fluid, in which the solution 501 of reactant A and the other is the solution 502 of reactant B are positioned up and down (see the channel cross-section F). Thereafter, when each of the fluids divided moves into the normal-line direction from the upper-side channel to the lower-side channel and also changes the route into the left direction perpendicular to the channel direction of the upstream side, since the fluid is rotated into the right direction by 180 degrees, and they are combined with in such a manner that one of the fluids divided covers on the other of the fluids divided, then the solution 501 of reactant A and the solution 502 of reactant B are positioned with each other, i.e., the fluid of four (4) layers (see the channel cross-section G).

By repeating the processes mentioned above, thus, in the case when assuming that the interface is rotated by 135 degrees, when the fluid(s) move(s) into the normal-line direction between the upper and the lower of the channels and also change the route into the rectangular direction with respect to the channel direction of the upstream side, in particular, when the fluid is divided, and it can be seen that it defines the fluid, in which the solution 501 of reactant A and the solution 502 of reactant B are positioned up and the down directions, necessarily, and furthermore, that since the number of the layers thereof increases, gradually, therefore the mixing is promoted.

Herein, in FIG. 9C, although it is assumed that the solution 501 of reactant A and the solution 502 of reactant B are fluids, which defines the interface between them (i.e., not mixed up with each other, completely); however, in actual, similar to that shown in FIG. 8B (or, FIG. 9A), those are mixed up in the processes of repeating dividing/combining of the fluids. Accordingly, it can be considered that, before the fluid(s) is/are divided, after dividing/combining of the fluid(s), by moving the fluid(s) into the normal-line direction from the lower-side channel to the upper-side channel, and by changing the route thereof into a rectangular direction with respect to the direction of the passage of the upstream side, the dividing/combining of the fluid(s) occur at high efficiency, and thereby mixing up the solutions.

According to the explanation of FIG. 8B (FIG. 9A), FIGS. 9B and 9C mentioned above, it was shown that, even if the angle rotating the interface is changed, before the fluid is divided, if moving the fluid into the normal line direction from the lower-side channel up to the upper-side channel, and also changing the route into the rectangular direction to the channel direction of the upstream side, after dividing/combining the fluid(s), then dividing/combining of the fluid(s) is generated, effectively, and they are mixed up with, gradually. However, since the angle of rotation of the interface depends on the Reynolds number, which is determined by the viscosity and/or the density of the fluid, the sending velocity of liquid, the width and/or the depth of the channel, etc., it is indicated that the mixing will be promoted even if the Reynolds number has any value. In particular, it can be seen that if the Reynolds number is large so that the ill influences due to rotation of the fluids appear, and as the rotation angle of the interface becomes large, the dividing/combining occur, effectively much more. Accordingly, with applying the microreactor according to the present invention, it is possible to maintain the mixing performance, even in the case where the flow rate is small.

And also, the microreactor according to the present invention, as was mentioned above, since it does not introduce two (2) kinds of solutions, i.e., the solution 501 of reactant A and the solution of reactant B, covering over the multi-layers (i.e., the upper-side plate 504 and the lower side plate 505), and in other words, it has the structure for introducing them from the holder plate 506 at the lowest layer to the lower-side plate 505, has no manifold so-called, on the reverse side of the portion where the reactants are introduced. Accordingly, if applying the microreactor according to the embodiment 1 mentioned above as the microreactors after the second step, in particular, it is possible to achieve precise control of the reaction time in the introducing portion, which is necessary for the multi-step reaction.

<Variation>

In the microreactor according to the embodiment 1, the details of which are mentioned in the above, mentioning was made on the structure of the channels, in which, after dividing (at the channel dividing portion 701)/combining (at the channel combining portion 702) thereof, the fluid moves into the normal-line direction from the lower-side channel to the upper-side channel and also changes the route thereof into the rectangular direction with respect to the channel direction of the upstream side (at the channel changing portion 703); however, next, explanation will be given on a variation of the first embodiment (the embodiment 1), which has the structure for not conducting this, hereinafter.

Figure 10A:
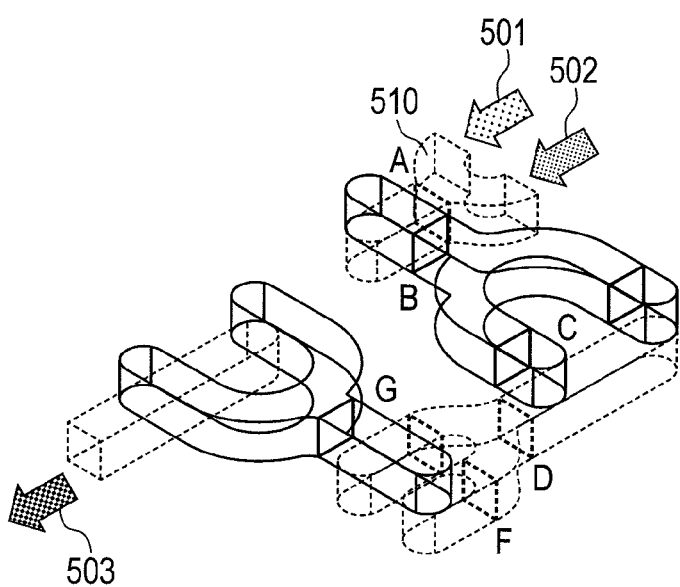
FIGS. 10A and 10B are views for showing a variation of the microreactor according to the first embodiment (the embodiment 1) mentioned above, in particular, a perspective view for showing positions of the channel cross-sections, for showing the rotation of the interface between the fluids within the microreactor (FIG. 10A), and a channel cross-section views for showing the rotating conditions of the interface between the fluids on that channel cross-sections when seeing from the upstream side to the downstream side.

FIG. 10A shows the structure of the channels, and as is apparent from the figure, in the microreactor according to this variation, the fluid does not move into the normal-line direction from the lower-side channel to the upper-side channel nor change the route thereof into the rectangular direction with respect to the channel direction of the upstream after the dividing/combining thereof, which are conducted in the microreactor according to the embodiments mentioned above, as was mentioned above, and in the figure are shown the positions of channel cross-sections A-F, for showing conditions of the rotating interface between the fluids within such channel. And, FIG. 10B shows the conditions of the rotating interface between the fluids on those channel cross-sections A-F.

Figure 10B:
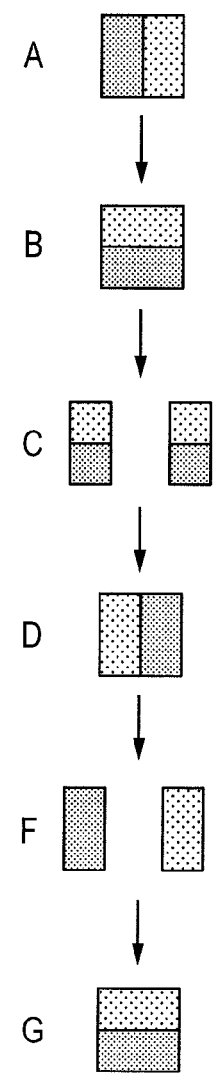

In this FIG. 10B, too, similar to that shown in FIG. 8B mentioned above, it is assumed that the solution 501 of reactant A and the solution 502 of reactant B are the fluids, which define the interface between them (i.e., do not mixed up with each other, completely). As is shown in the figure, first of all, just after being introduced, the solution 501 of reactant A and the solution 502 of reactant B define a fluid, in which they are positioned at the left-hand and the right-hand sides, respectively (see the channel cross-section A). And, by moving into the normal-line direction from the lower-side channel up to the upper-side channel and also changing the route into the left direction perpendicular to the channel direction of the upstream side, and thereby rotating the interface between the fluids by 90 degrees, then the solution 501 of reactant A and the solution 502 of reactant B define the fluid, in which they are positioned up and down, respectively (see the channel cross-section B). Thereafter, the fluid is divided, and then each of the fluids divided defines the fluid, in which the solution 501 of reactant A and the solution 502 of reactant B are positioned up and down therein (see the channel cross-section C). Thereafter, each of the fluids divided moves into the normal-line direction from the upper-side channel down to the lower-side channel, and also changes the route into the right direction perpendicular to the channel direction of the upstream side. In this instance, the fluids are rotated into the right direction by 90 degrees; however, they are combined with in such a manner that one of the fluids divided covers over the other of the fluids divided, therefore they define the fluid, in which the solution 501 of reactant A and the solution 502 of reactant B are positioned at the left-hand and the right-hand sides, respectively (see the channel cross-section D). However, heretofore, it is same to the case shown in FIG. 8B.

Thereafter, since the fluid is divided, immediately, into the left and the right directions, one of the fluids is the solution 501 of reactant A while the other thereof is the solution 502 of reactant B. Thereafter, each of the fluids divided moves into the normal-line direction from the upper-side channel to the lower-side channel, and also changes the route into the left direction perpendicular to the channel direction of the upstream side. In this instance, though the fluids are rotated into the left direction by 90 degrees, but since they are combined in such a manner that one of the fluids divided covers over the other of the fluids divide, again, they define a fluid, in which the solution 501 of reactant A and the solution 502 of reactant B are positioned up and down, respectively (see the channel cross-section F).

Accordingly, when the fluid(s) move into the normal-line direction from the lower-side channel to the upper-side channel, after dividing/combining thereof, but not change the route into the rectangular direction with respect to the channel direction of the upstream side, since there are cases where they define a fluid, in which the solution 501 of reactant A and the solution 502 of reactant B are positioned up and down, and where they are positioned at the left-hand and the right-hand sides, before the fluid is divided, then it can be seen that the dividing/combining of the fluid(s) will not occur effectively, comparing to the case where the fluid moves into the normal-line direction from the lower-side channel to the upper-side channel and further changes the route thereof into the rectangular direction with respect to the channel direction of the upstream side, after being divided/combined, as is shown in FIG. 8B.

Also, in actual, when the fluids are rotated, not only the interface between the fluids is rotated, but also the interface between the fluids itself is disturbed. Accordingly, if the number of times of rotating the fluids becomes large, or when the rotating angle becomes large, it can be considered that the interface between the fluids is disturbed and therefore the fluids can be mixed up with, easily much more.

Figure 11:
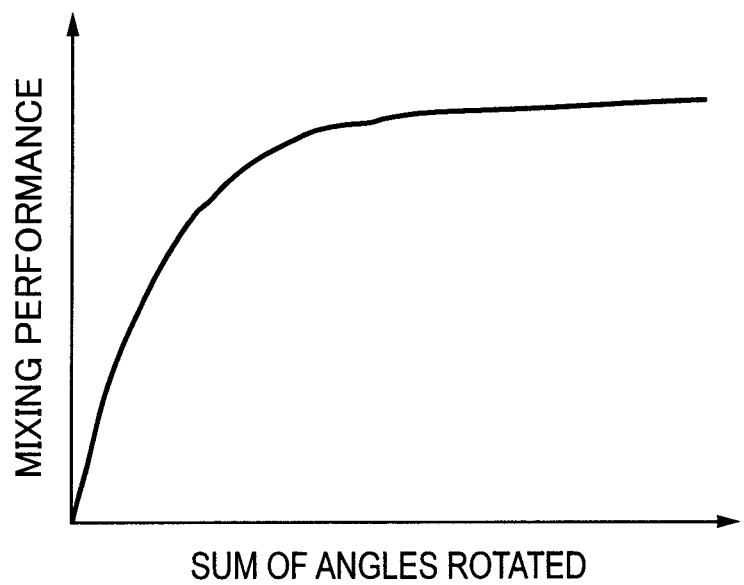
FIG. 11 is a view for showing a relationship between a mixing property and a sum of angles, by which the fluids are rotated.

FIG. 11 is a graph for showing the relationship between the mixing performance and a sum of the angles, with which the fluid(s) are rotated. At a time-point when the solution 501 of reactant A and the solution 502 of reactant B repeat the dividing/combining two (2) times (see the channel cross-section G), after being introduced, if they move into the normal-line direction from the lower-side channel to the upper-side channel, and also change the route into the rectangular direction with respect to the channel direction of the upstream side, then the sum of the rotating angles comes to 360 degrees, if putting those in the left direction and the right direction together. On the other hand, as is shown in FIG. 10B, if they do not move into the normal-line direction nor change the route into the rectangular direction, the sum of the rotating angles comes to 270 degrees, even if putting those in the left direction and the right direction together. Herein, judging from FIG. 11, because the larger the sum of the angles, the larger the mixing performance, the rotating angle becomes large, necessarily, in the case shown in FIG. 8B, adding such processing, "moving into the normal-line direction from the lower-side channel to the upper-side channel, and changing the route into the rectangular direction with respect to the channel direction of the upstream side", and therefore it can be said that the fluids can mix up, easily much more, from a viewpoint of the disturbance of the interface between the fluids itself.

Accordingly, with the microreactor according to the first embodiment (the embodiment 1) of the present invention, being provided with no manifold, which is a cause of the reason of generating the dead volume, then the mixing performance can be improved to be high even if the channel for sending the liquid is small, and the microprocessor can be constructed with only (2) pieces of plates, easily and/or simply. And also, with the microreactor system applying this microprocessor therein, it is possible to implement the multi-step reaction, easily.

However, as the angle changing the route is used such expression "perpendicular" or "rectangular" in the explanation of the microreactor, according to the first embodiment (the embodiment 1) of the present invention mentioned above; however, it does not always come to "in the right direction by 90 degrees" or "in the left direction by 90 degrees", necessarily, depending on processing accuracies of the channels. Also, the angle of rotation of the interface depends on the Reynolds number, but it is apparent that the mixing is promoted because the fluid(s) move(s) into the normal-line direction from the lower-side channel to the upper-side channel and further change(s) the route into the rectangular direction with respect to the channel direction of the upstream side, if the angle for changing the route is not "in the right direction by 90 degrees" or "in the left direction by 90 degrees", correctly.

Embodiment 2

Next, explanation will be given on the structure of the microreactor, according to a second embodiment (an embodiment 2) of the present invention, by referring to FIGS. 12A and 12B and 13A and 13B.

Figure 12A:
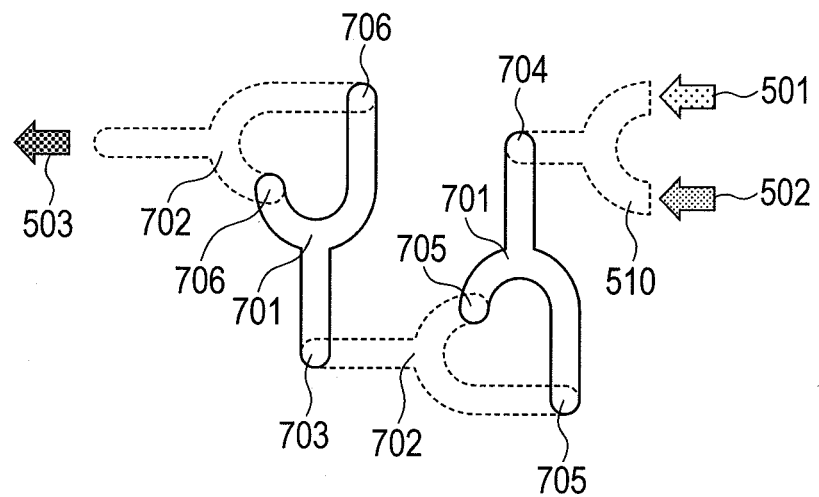
FIGS. 12A and 12B are views for showing the channel configuration of the microreactor according to a second embodiment (an embodiment 2) of the present invention, in particular, a plane view (FIG. 12A) and a perspective view thereof (FIG. 12B) thereof.
Figure 12B:
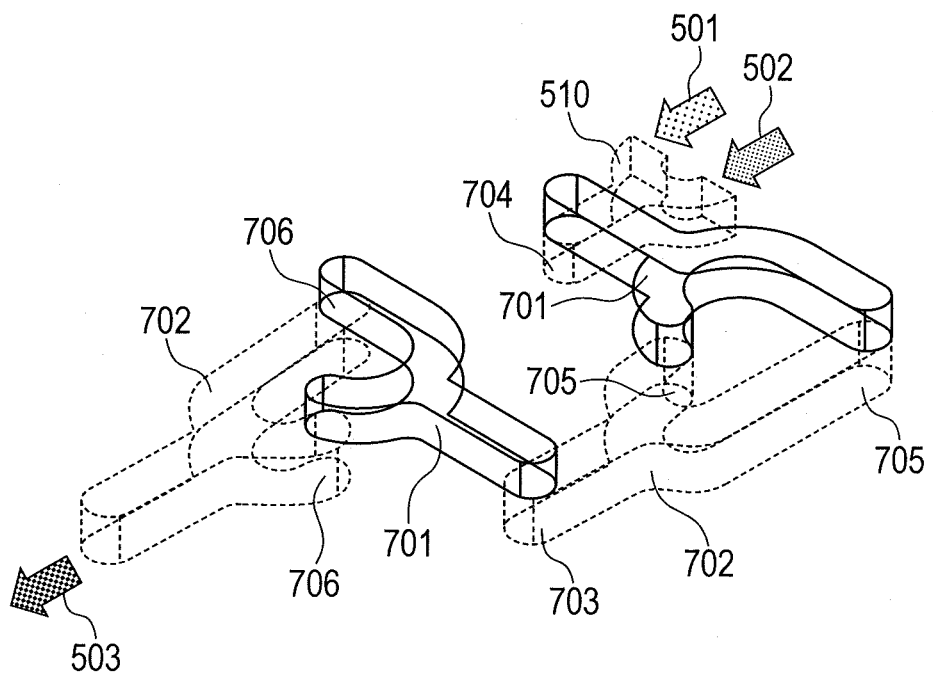

First of all, FIG. 12A is a plane view for showing the channel configuration in the microreactor according to the second embodiment (the embodiment 2) of the present invention, and FIG. 12B is a perspective view thereof.

The channel 510 within the microreactor according to the present embodiment 2 is made up with an upper-side portion and a lower-side portion, wherein the solution 501 of reactant A and the solution 502 of reactant B, which are introduced, move into the normal-line direction from the lower-side channel up to the upper-side channel and also change the route into the left direction perpendicular to the channel direction of the upstream side, at the channel changing portion 704. And at the channel dividing portion 701, the channel is divided into the left and the right, and thereafter the fluids move into the normal-line direction from the upper-side channel to the lower-side channel, and also change the route into the right direction perpendicular to the channel direction of the upstream side, at a channel changing portion 705. And, at the channel combining portion 702, the fluids divided position at the left-hand side and the right-hand side, and thereafter, they further move into the normal-line direction from the lower-side channel to the upper-side channel and also change the route into the right direction perpendicular to the channel direction of the upstream side. Thus, the channel 501 has the configuration of conducting such operations as was mentioned above, repetitively.

With this, the solution 501 of reactant A and the solution 502 of reactant B are mixed up with, quickly, and finally, the product solution can be obtained through the mixing/reacting between the solution 501 of reactant A and the solution 502 of reactant B.

Figure 13A:
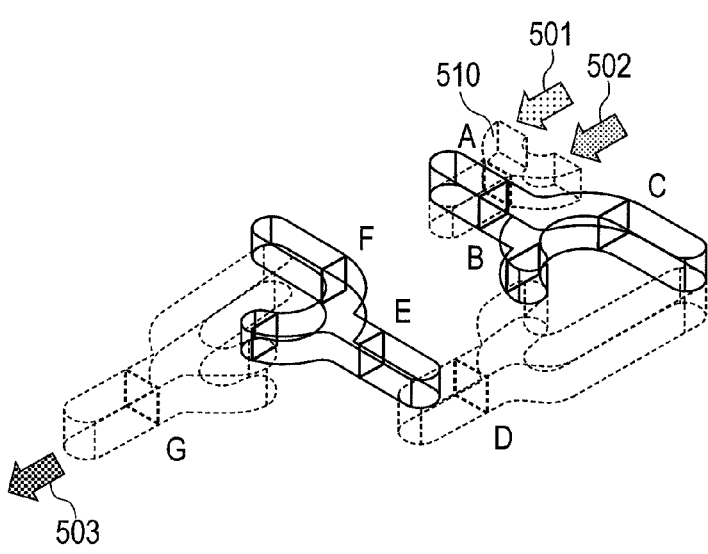
FIGS. 13A and 13B are views for showing the rotation of the interface between the fluids within the microreactor according to the second embodiment (the embodiment 2) mentioned above, in particular, a perspective view for showing positions of the channel cross-sections for showing the rotations of the interface (FIG. 13A) and channel cross-section views for showing the rotating conditions of the interface between the fluids on that channel cross-sections when seeing from the upstream side to the downstream side (FIG. 13B)
Figure 13B:
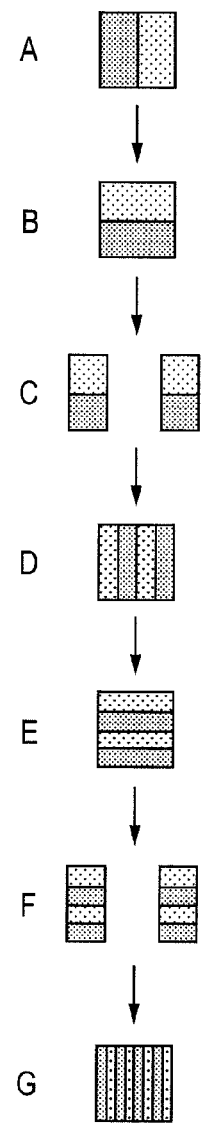

FIGS. 13A and 13B show the rotation of the interface between the fluids within the microreactor, according to the second embodiment (the embodiment 2) mentioned above, wherein in particular, FIG. 13A shows positions within the channel, for showing the rotating conditions of the interface between the fluids on the channel cross-sections A-G, and FIG. 13B shows the rotating conditions of the interface between the fluids on the channel cross-sections A-G, when seeing the channel from the upstream side to the downstream side thereof.

In particular, in FIG. 13B, it is assumed that the solution 501 of reactant A and the solution 502 of reactant B are the fluids defining the interface between them (i.e., do not mixed up with each other, completely). As is shown in the figure, first of all, just after they are introduced, the solution 501 of reactant A and the solution 502 of reactant B define the fluids positioning at the left-hand side and the right-hand side, respectively (see the channel cross-section A). And, they move into the normal-line direction form the lower-side channel to the upper-side channel, and also change the route into the left direction perpendicular to the channel direction of the upstream side, and further the interface between the fluids is rotated by 90 degrees; thereby the solution 501 of reactant A and the solution 502 of reactant B come to the fluids positioning up and down (see the channel cross-section B). Thereafter, the fluids are divided into the left and the right directions, and therefore each of the fluids divided define the fluid, in which the solution 501 of reactant A and the solution 502 of reactant B are positioned up and down (see the channel cross-section C). Thereafter, each of the fluids divided moves into the normal-line direction from the upper-side channel to the lower-side channel, and also changes the route into the right direction perpendicular to the channel direction of the upstream side, and the fluids is rotated in the left direction by 90 degrees. And, they are combined with, while positioning at the left-hand side and the right-hand side, and thereby defining the fluid of four (4) layers, in which the solution 501 of reactant A and the solution 502 of reactant B position at the left and the right directions with each other (see the channel cross-section D).

Further, the fluids move into the normal-line direction from the lower-side channel up to the upper-side channel, and also change the route into the right direction perpendicular to the channel direction of the upstream side, and further they are rotated into the right direction by 90 degrees, thereby defining the fluid of four (4) layers positioning the solution 501 of reactant A and the solution 502 of reactant B into the up and down directions with each other (see the channel cross-section E).

Thereafter, the fluid is divided, and each of the fluids divided comes to the fluid of four (4) layers, each positioning the solution 501 of reactant A and the solution 502 of reactant B into the up and down directions with each other (see the channel cross-section F). And, each of the fluids divided moves into the normal-line direction from the upper-side channel down to the lower-side channel, and also changes the route into the left direction perpendicular to the channel direction of the upstream side, and further the fluid is rotated in the right direction by 90 degrees. Thereafter, they are combined with, while positioning at the left-hand and the right-hand sides, and thereby defining the fluid of eight (8) layers, in which the solution 501 of reactant A and the solution 502 of reactant B are positioned at the left-hand and the right-hand sides with each other (see the channel cross-section G).

Herein, in FIG. 13B mentioned above, it is assumed that the solution 501 of reactant A and the solution 502 of reactant B are the fluid, which define the interface between them (i.e., do not mixed up with each other, completely), but similar to those shown in FIG. 8B and/or FIG. 9A-C, in actual, they are mixed up with, gradually, in the processes of repeating the dividing/combining of the fluid(s). Accordingly, after the dividing/combining of the fluid(s), by moving them into the normal-line direction from the lower-side channel up to the upper-side channel, and also by changing the route thereof into the rectangular direction with respect to the channel direction of the upstream side, the solution 501 of reactant A and the solution 502 of reactant B define a fluid, in which they are positioned up and down, necessarily, before the fluid is divided, and after dividing the fluid, by moving it into the normal-line direction from the upper-side channel down to the lower-side channel, and further by changing the route thereof into the rectangular direction with respect to the channel direction of the upstream side, the number of the layers defined therein is increased, and the substantial diffusion distance of molecules is shorten; therefore, the dividing/combining of the fluid(s) occurs, at high efficiency. Also, judging from a viewpoint of the disturbance of the interface between the fluids itself, with provision of the process "moving into the normal-line direction from the lower-side channel to the upper-side channel, and changing the route into the rectangular direction with respect to the channel direction of the upstream side", they can be mixed up with, easily.

Accordingly, also with the microreactor according to the second embodiment (the embodiment 2) of the present invention, it is possible to build up the microreactor having high mixing performance eve with the small channel for sending the fluid, by two (2) pieces of plates, easily, without providing the manifold, which is a cause of reason of the dead volume.

Embodiment 3

Figure 14:
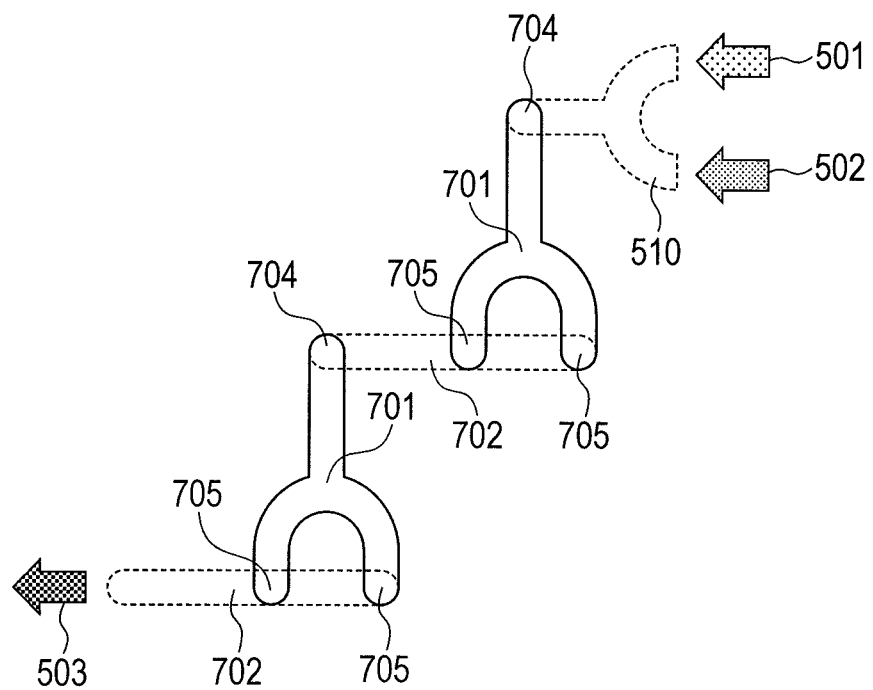
FIG. 14 is a plan view for showing the channel configuration of the microreactor according to a third embodiment (an embodiment 3) of the present invention.

Further, explanation will be given on the channel configuration of a microreactor, according to a third embodiment (an embodiment 3) of the present invention, by referring to FIG. 14. This FIG. 14 is a plane view for showing the microreactor, according to the third embodiment (the embodiment 3) of the present invention, in particular, the channel configuration thereof.

As is shown in this figure, the channel 501 is made up with an upper-side portion and a lower-side portion, wherein a fluid including the solution 501 of reactant A and the solution 502 of reactant B moves into the normal-line direction from the lower-side channel up to the upper-side channel, and also change the route into the left direction perpendicular to the channel direction of the upstream side. Thereafter, the fluid is split into the left and the right directions at the channel dividing portion 701, and each moves into the normal-line direction from the upper-side channel down to the lower-side channel and further changes the route into the right diction perpendicular to the channel direction of the upstream side.

Thereafter, after the fluids divided define a fluid, in which the solutions are positioned up and down, at the channel combining portion 702, it moves into the normal-line direction from the lower-side channel up to the upper-side channel and also changes the route into the left direction perpendicular to the channel direction of the upstream side. Thus, the channel 501 has the configuration for repeating the operations mentioned above.

With this, mixing of the solution 501 of reactant A and the solution 502 of reactant B is conducted, quickly, and finally through mixing/reacting between the solution 501 of reactant A and the solution 502 of reactant B, there is obtained the product solution 503, i.e., a product thereof.

Accordingly, also with the microreactor according to the second embodiment (the embodiment 3) of the present invention, it is possible to build up the microreactor having high mixing performance in spite of the small channel for sending the fluid, by two (2) pieces of plates, easily, without providing the manifold, which is a cause of reason of the dead volume.

Embodiment 4

Figure 15:
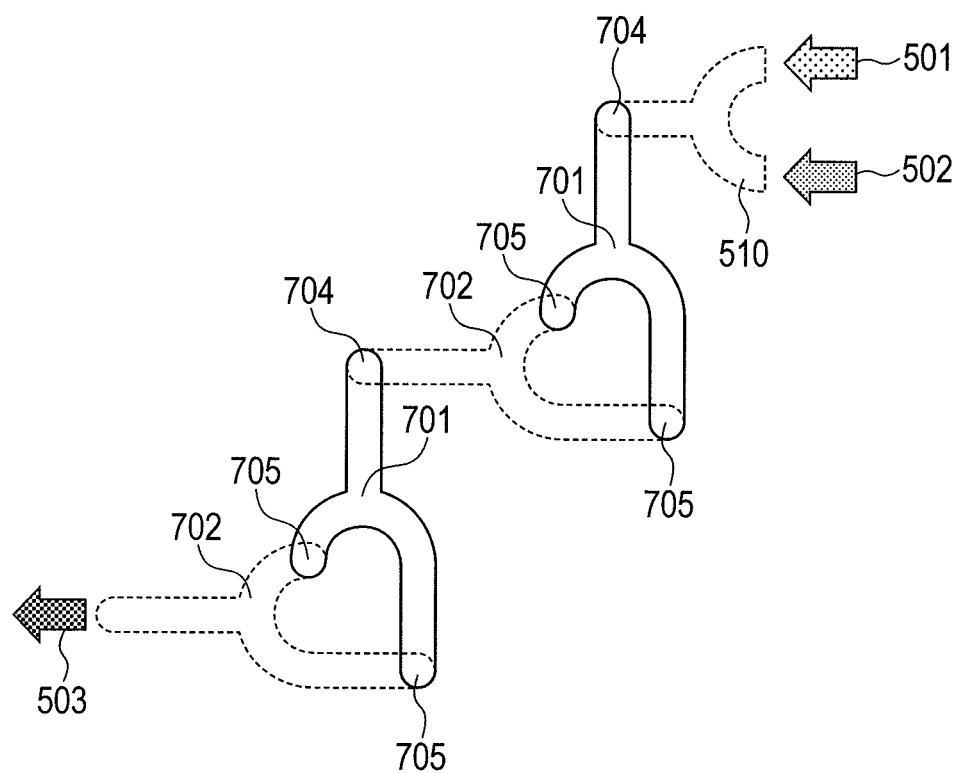
FIG. 15 is a plan view for showing the channel configuration of the microreactor according to a fourth embodiment (an embodiment 4) of the present invention.

Also, explanation will be given on the channel configuration of the microreactor according to a fourth embodiment (an embodiment 4) of the present invention, by referring to FIG. 15. This FIG. 15 is a plane view for showing the channel configuration of the microreactor according to the fourth embodiment (the embodiment 4).

As is apparent from the figure, the channel 510 within the microreactor according to the present embodiment 4 is made up with an upper-side portion and a lower-side portion, wherein the solution 501 of reactant A and the solution 502 of reactant B, which are introduced, move into the normal-line direction from the lower-side channel up to the upper-side channel, and also change the route at 704 into the left direction perpendicular to the channel direction of the upstream side. And, being divided into the left and the right sides at 701, each moves into the normal-line direction from the upper-side channel down to the lower-side channel, and also changes the route into the right direction perpendicular to the channel direction of the upstream side, at the channel changing portion 705, and at the channel combining portion 702, it is combined with in such a manner that the fluids divided are positioned the left and the right sides. Thereafter, at the channel changing portion 704, the fluid further moves into the normal-line direction from the lower-side channel up to the upper-side channel, and changes the route into the left direction perpendicular to the channel direction of the upstream side. Thus, the channel 510 has such configuration that the operation mentioned above is repeated therein.

With this, mixing of the solution 501 of reactant A and the solution 502 of reactant B is conducted, quickly, and finally through mixing/reacting between the solution 501 of reactant A and the solution 502 of reactant B, there is obtained the product solution 503, i.e., a product thereof.

Accordingly, also with the microreactor according to the fourth embodiment (the embodiment 4) of the present invention, it is possible to build up the microreactor having high mixing performance in spite of the small channel for sending the fluid, by two (2) pieces of plates, easily, because of no provision of the manifold, which is a cause of reason of the dead volume.

Embodiment 5

Figure 16:
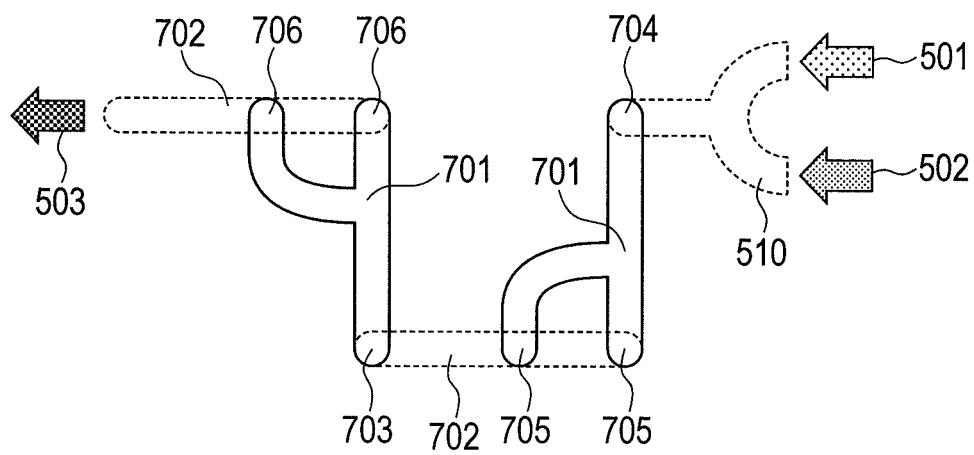
FIG. 16 is a plan view for showing the channel configuration of the microreactor according to a fifth embodiment (an embodiment 5) of the present invention.

Also, explanation will be given on the channel configuration of the microreactor according to a fifth embodiment (an embodiment 5) of the present invention, by referring to FIG. 16. Further, this FIG. 16 is a plane view for showing the channel configuration of the microreactor according to the fifth embodiment (the embodiment 5).

The channel 510 within the microreactor according to the present embodiment 5 is also made up with an upper-side portion and a lower-side portion, wherein a fluid comprising the solution 501 of reactant A and the solution 502 of reactant B, which are introduced, moves into the normal-line direction from the lower-side channel up to the upper-side channel, and further changes the route at 704 into the left direction perpendicular to the channel direction of the upstream side. Thereafter, at the channel dividing portion 701, it is divided into two (2) channels, i.e., a straight-forward direction and the direction perpendicular to the channel direction of the upstream side. And at the channel changing portion 705, each moves into the normal-line direction from the upper-side channel down to the lower-side channel, and also changes the route, again, into the normal-line direction from the upper-side channel down to the lower-side channel, and also change the route into the right direction perpendicular to the channel direction of the upstream side. Further, at the channel combining portion 702, after being combined with in such a manner that the fluids divided are positioned up and down, again, at the channel changing portion 703, they move into the normal-line direction from the lower-side channel up to the upper-side channel, and also change the routes into the right direction perpendicular to the channel direction of the upstream side. Thus, the channel 510 has such configuration that the operation mentioned above is repeated therein.

With this, mixing of the solution 501 of reactant A and the solution 502 of reactant B is conducted, quickly, and finally through mixing/reacting between the solution 501 of reactant A and the solution 502 of reactant B, there is obtained the product solution 503, i.e., a product thereof. Also, by bringing the channel volume from the dividing up to the combining to be equal, between the fluids divided, as far as possible, it is possible to control the reacting time, strictly, much more.

Accordingly, also with the microreactor according to the fourth embodiment (the embodiment 4) of the present invention, it is possible to build up the microreactor having high mixing performance in spite of the small channel for sending the fluid, by two (2) pieces of plates, easily, without provision of the manifold, which is a cause of reason of the dead volume.

Embodiment 6

Figure 17:
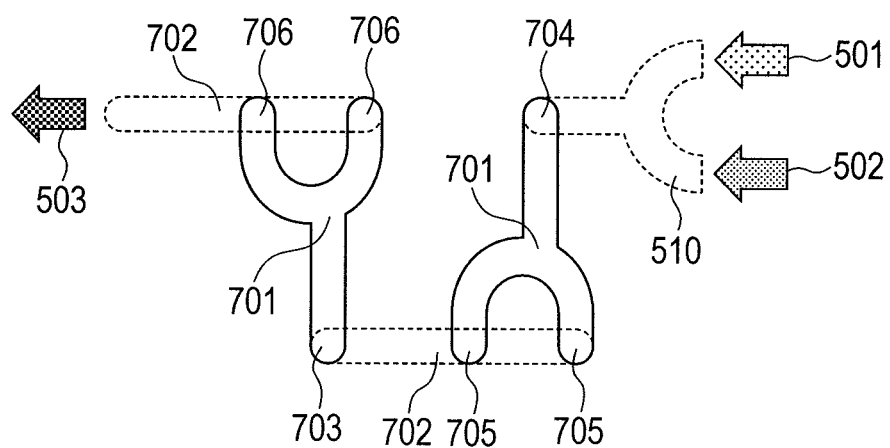
FIG. 17 is a plan view for showing the channel configuration of the microreactor according to a sixth embodiment (an embodiment 6) of the present invention.

And, explanation will be given on the channel configuration of the microreactor according to a sixth embodiment (an embodiment 6) of the present invention, by referring to FIG. 17. Further, this FIG. 17 is a plane view for showing the channel configuration of the microreactor according to the sixth embodiment (the embodiment 6).

The channel 510 within the microreactor according to the present sixth embodiment (the embodiment 6), as is apparent from the figure, also made up with an upper-side portion and a lower-side portion, wherein a fluid comprising the solution 501 of reactant A and the solution 502 of reactant B, which are introduced, moves into the normal-line direction from the lower-side channel up to the upper-side channel, at the channel changing portion 704, and also changes the route into the left direction perpendicular to the channel direction of the upstream side. Thereafter, although it is divided into the left and the right sides at the channel dividing portion 701; however, in this instance, a dividing angle of the channel on the side is made small, into the lower-side of which the fluid flows when they are combined, and thereby bringing the time-period from the dividing up to the combining to be equal to each other, as far as possible. And, at the channel changing portion 705, each moves into the normal-line direction from the upper-side channel down to the lower-side channel, and also changes the route into the right direction perpendicular to the channel direction of the upstream side, and further at the channel combining portion 702, after they are combined with in such a manner that the fluids divided are positioned up and down, again, at the channel changing portion 703, each moves into the normal-line direction from the upper-side channel down to the lower-side channel, and also changes the route into the right direction perpendicular to the channel direction of the upstream side. Thus, the channel 510 has such configuration that the operation mentioned above is repeated therein.

With this, mixing of the solution 501 of reactant A and the solution 502 of reactant B is conducted, quickly, and finally through mixing/reacting between the solution 501 of reactant A and the solution 502 of reactant B, there is obtained the product solution 503, i.e., a product thereof. Also, because of being divided into the left and the right sides, comparing to the case where the channel is divided into two (2), i.e., the straight-forward direction and the direction perpendicular direction to the channel direction of the upstream side as is in the microreactor according to the fifth embodiment (the embodiment 5) of the present invention shown in FIG. 16, a possibility is low of being disturbed in a flow of the fluid when being divided.

Accordingly, also with the microreactor according to the sixth embodiment (the embodiment 6) of the present invention, there is no necessity of providing the manifold, which is a cause of reason of the dead volume, and for that reason, it is possible to build up the microreactor having high mixing performance in spite of the small channel for sending the fluid, by two (2) pieces of plates, easily, without providing.

However, in the microreactors according to the second to the sixth embodiments (the embodiments 2 to 6) mentioned above, regarding the number of repetition of the dividing/combining, it should not be limited to that number mentioned above, but can be changed, appropriately, depending on the physical properties and/or the reacting time, etc., to be applied.

Also, similar to the explanation given on the first embodiment (the embodiment 1) mentioned above, as the angle changing the route is used such expression "perpendicular" or "rectangular" in the explanation of the microreactor, according to the first embodiment (the embodiment 1) of the present invention mentioned above; however, it does not always come to "in the right direction by 90 degrees" or "in the left direction by 90 degrees", necessarily, depending on processing accuracies of the channels. Also, although the angle of rotation of the interface depends on the Reynolds number, it is enough that if an angle of changing the route not be "into the right direction perpendicular to" or "into the left direction perpendicular to", correctly; for example, preferably, if it lies within a range of 85-95 degrees into the left direction or the right direction, the mixing can be promoted by moving the fluid into the normal-line direction from the lower-side channel up to the upper-side channel and further changing the route into the rectangular direction with respect to the channel direction of the upstream side.

Further, in the explanation of the microreactors, according to the first to the sixth embodiments (the embodiments 1-6) of the present invention mentioned above, the expressions "upper-side" and "lower-side" are used for the purpose of convenience; however, the same effects can be obtained if they are position inversely of up and down. Also, the relationship of "up and down" may be the same to that of positioning the left/right or the right/left side(s), or may be a relationship of positioning obliquely.

Also, in the explanation given in the above, the repressions are used under the assumption that the solutions are reacted in an inside thereof; however, the microreactor according to the present invention is also applicable into the case where the reaction does not proceed in the inside thereof, completely, i.e., in the case of mixing up the solutions, simply. Further, it is also applicable into, not only a homogenous system for mixing up with each other, but also an inhomogeneous system not mixing up with each other.

EXPLANATION OF MARKS

101 . . . solution of reactant 1, 102 . . . solution of reactant 2, 103 . . . solution of reactant 3, 104 . . . product solution through mixing/reacting of solution of reactant 1, solution of reactant 2 and solution of reactant 3, 105 . . . syringe, 106 . . . syringe pump, 107 . . . introducing portion of solution of reactant 1, 108 . . . introducing portion of solution of reactant 2, 109 . . . microreactor, 110 . . . reacting portion of reaction at first step, 111 . . . introducing portion of solution of reactant 3, 112 . . . reacting portion of reaction at second step, 113 . . . liquid sending unit, 114 . . . reactor unit, 115 . . . temperature control unit, 116 . . . control unit, 117 . . . control and feedback of liquid sending unit, 118 . . . data communication between temperature control unit and liquid sending unit, 119 . . . data communication between reactor unit and liquid sending unit, 120 . . . control and feedback of temperature control, 201 . . . microreactor for use of reaction at first step, 202 . . . microreactor for use of reaction at second step, 301 . . . pressure sensor, 302 . . . switching valve, 303 . . . wasting line, 304 . . . feeding line, 401 . . . T-connector, 402 . . . additional liquid sending unit, 501 . . . solution of reactant A, 502 . . . solution of reactant B, 503 . . . product solution, 504 . . . upper-side plate, 505 . . . lower-side plate, 506 . . . holder plate, 507 . . . screw hole, 508 . . . thread cutting, 509 . . . packing groove, 510 . . . channel, 511 . . . inlet for the solution of reactant A, 512 . . . inlet for the solution of reactant B, 513 . . . outlet for the solution of product, 701 . . . channel dividing portion, 702 . . . channel combining portion, 703, 704, 705 and 706 . . . channel changing portion.

What is claimed is:

1. A microreactor, having channels for mixing at least two (2) kinds of fluids, for mixing up the fluids through dividing of the fluids and combining the fluids divided, comprising in an inside thereof:
   (a) at least two (2) pieces of channels, which are formed within a certain plane, to introduce the fluids therein;
   (b) channels, which are formed on said plane, to combine the fluids introduced;
   (c) channels, which are configured so that the fluids combined change a flow path into a direction approximately parallel with a plane, on which a flow path of the fluids to be combined lies and also rectangular to the flow path of the fluids to be combined;
   (d) channels, which are formed within the plane, on which said channels lie, to divide the fluids combined into two (2) thereof;
   (e) channels, which are configured to change the flow path into a direction approximately parallel with the plane, on which said channel to divide, and approximately rectangular to said channel to divide, after each of the fluids divided flows into a direction near to the normal line;
   (f) channels, which are formed within the plane, on which said channels lie, to combine two (2) fluids divided in a direction approximately vertical or approximately parallel with respect to said plane; and (g) channels, which are configured to advance the combined fluids into a direction approximately parallel with a plane, on which said combined channels lie, and approximately rectangular to said combined channels lie, wherein each of said channels of (b) to (g) is formed in an inside of said microreactor, at least two (2) or more numbers thereof.

2. The microreactor as described in the claim 1, wherein
said channels are formed by facing two (2) pieces of a plane-like plate, each of which has the channels, opposing to each other, and
on an opposing surface of one of said plates are formed said channels of (a), (b), (e) and (f), while
on an opposing surface of the other of said plate are formed said channels of (c), (d) and (g).

3. A microreactor system for combining at least three (3) kinds of fluids therein, comprising:
a sending unit, which is configured to send said fluids;
a reactor unit, which includes at least two (2) microreactors, each for reacting at least two (2) kinds of fluids therein;
a temperature control unit, which is configured to execute temperature control of said reactor unit; and
a control unit, wherein
said sending unit, said reactor unit and said temperature control unit are controlled and monitored,
said fluids are sent by a syringe and a syringe pump, which are included in said sending unit,
said microreactors are provided in series directing from an upstream side to a downstream side,
temperatures of said microreactors are controlled, separately, for each microreactor, through said temperature control unit, and
each of said microreactors is that, which is described in the claim 2.

4. The microreactor as described in the claim 3, wherein
at least one (1) kind of said fluids is sent by operating two (2) pieces of syringes, simultaneously.

5. The microreactor as described in the claim 3, wherein
said control unit executes at least two (2) operations, continuously, through instructing said at least two (2) operations to be executed continuously by said sending unit, in advance.

6. A microreactor system for combining at least three (3) kinds of fluids therein, comprising:
a sending unit, which is configured to send said fluids;
a reactor unit, which includes at least two (2) microreactors, each for reacting at least two (2) kinds of fluids therein;
a temperature control unit, which is configured to execute temperature control of said reactor unit; and
a control unit, wherein
said sending unit, said reactor unit and said temperature control unit are controlled and monitored,
said fluids are sent by a syringe and a syringe pump, which are included in said sending unit,
said microreactors are provided in series directing from an upstream side to a downstream side,
temperatures of said microreactors are controlled, separately, for each microreactor, through said temperature control unit, and
each of said microreactors is that, which is described in the claim 1.

7. The microreactor as described in the claim 6, wherein
at least one (1) kind of said fluids is sent by operating two (2) pieces of syringes, simultaneously.

8. The microreactor as described in the claim 6, wherein
said control unit executes at least two (2) operations, continuously, through instructing said at least two (2) operations to be executed continuously by said sending unit, in advance.

* * * * *